(12) United States Patent
Xiong et al.

(10) Patent No.: US 11,503,004 B2
(45) Date of Patent: Nov. 15, 2022

(54) DISTRIBUTED IPSEC GATEWAY

(71) Applicant: Microsoft Technology Licensing, LLC, Redmond, WA (US)

(72) Inventors: Yongqiang Xiong, Beijing (CN); Chih-Yung Wang, Beijing (CN); Jeongseok Son, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 485 days.

(21) Appl. No.: 16/605,685

(22) PCT Filed: May 1, 2018

(86) PCT No.: PCT/US2018/030333
§ 371 (c)(1),
(2) Date: Oct. 16, 2019

(87) PCT Pub. No.: WO2018/222323
PCT Pub. Date: Dec. 6, 2018

(65) Prior Publication Data
US 2020/0351254 A1    Nov. 5, 2020

(30) Foreign Application Priority Data

May 31, 2017 (CN) .......................... 201710401488.2

(51) Int. Cl.
*H04L 29/06* (2006.01)
*H04L 9/40* (2022.01)
(Continued)

(52) U.S. Cl.
CPC ...... *H04L 63/0485* (2013.01); *G06F 9/45558* (2013.01); *G06F 9/5077* (2013.01);
(Continued)

(58) Field of Classification Search
CPC .. H04L 63/0485; H04L 63/0272; G06F 21/53
See application file for complete search history.

(56) References Cited

U.S. PATENT DOCUMENTS

| 7,571,463 B1 | 8/2009 | Fedyk et al. |
| 7,844,719 B2 | 11/2010 | Detienne et al. |

(Continued)

FOREIGN PATENT DOCUMENTS

| CN | 105828315 A | 8/2016 |
| CN | 106161174 A | 11/2016 |

(Continued)

OTHER PUBLICATIONS

"Amazon Virtual Private Cloud (VPC)", Retrieved from: http://web.archive.org/web/20170506091850/https://aws.amazon.com/vpc/, May 6, 2017, 5 Pages.

(Continued)

*Primary Examiner* — Dao Q Ho
(74) *Attorney, Agent, or Firm* — Schwegman Lundberg & Woessner, P.A.

(57) ABSTRACT

The present disclosure provides technical solutions related to distributed IPSec gateway. A control plane and a data plane of the IPSec gateway are divided, a plurality of gateway processing nodes may be run in the data plane to process data packets of incoming ESP/AR traffic and/or data packets of outgoing IP traffic. IKE information interaction may be handled in the control plane and the traffic may be steered on each gateway processing node in the data plane.

20 Claims, 7 Drawing Sheets

(51) Int. Cl.
  *G06F 9/455* (2018.01)
  *G06F 9/50* (2006.01)
  *H04L 12/66* (2006.01)

(52) U.S. Cl.
  CPC ............ *H04L 12/66* (2013.01); *H04L 63/029* (2013.01); *H04L 63/0272* (2013.01); *G06F 2009/4557* (2013.01); *G06F 2009/45595* (2013.01); *G06F 2209/5011* (2013.01)

(56) References Cited

U.S. PATENT DOCUMENTS

| | | | |
|---|---|---|---|
| 8,464,335 | B1 | 6/2013 | Sinha et al. |
| 9,203,784 | B2 | 12/2015 | Chang et al. |
| 9,391,801 | B2 | 7/2016 | Raghu |
| 9,503,371 | B2 | 11/2016 | Thakkar et al. |
| 9,660,905 | B2 | 5/2017 | Dunbar et al. |
| 2002/0083344 | A1* | 6/2002 | Vairavan ............ H04L 63/0227 726/13 |
| 2008/0092229 | A1 | 4/2008 | Khanna et al. |
| 2012/0096269 | A1* | 4/2012 | McAlister ............ H04L 63/061 713/171 |
| 2012/0226792 | A1* | 9/2012 | Johnson ................ H04L 63/164 709/223 |
| 2014/0307744 | A1 | 10/2014 | Dunbar et al. |
| 2016/0057171 | A1 | 2/2016 | Decusatis et al. |
| 2017/0086111 | A1* | 3/2017 | Vrzic .................. H04W 36/023 |
| 2017/0094512 | A1* | 3/2017 | Kiss ....................... H04W 12/06 |
| 2018/0205722 | A1* | 7/2018 | Getschmann ....... H04L 63/0876 |
| 2018/0262598 | A1* | 9/2018 | Zhang ................. H04L 12/4633 |

FOREIGN PATENT DOCUMENTS

| | | |
|---|---|---|
| CN | 106161289 A | 11/2016 |
| EP | 2381647 A1 | 10/2011 |
| WO | 2014093155 A1 | 6/2014 |

OTHER PUBLICATIONS

"Data Sheet", Retrieved from: https://www.ncp-e.com/fileadmin/pdf/library/datasheets/NCP_DS_Enterprise_VPN_Server.pdf, Retrieved Date: Dec. 16, 2019, 6 Pages.
"Filter Drivers", Retrieved from: http://web.archive.org/web/20170513123349/https://msdn.microsoft.com/en-us/library/windows/hardware/ff545890(v=vs.85).aspx, May 13, 2017, 1 Page.
"High Availability", Retrieved from: http://web.archive.org/web/20181221161446/https://wiki.strongswan.org/projects/strongswan/wiki/HighAvailability, Dec. 21, 2018, 5 Pages.
"IPSec Stateful Failover (VPN High Availability) Feature Module", Retrieved from: https://www.cisco.com/c/en/us/td/docs/ios/12_2/12_2y/12_2yx11/feature/guide/ft_vpnha.html, Jan. 17, 2005, 73 Pages.
"Remote Access Service", Retrieve from: http://web.archive.org/web/20170710112635/https://technet.microsoft.com/en-us/library/dn636119(v=ws.11).aspx, Jul. 2, 2014, 2 Pages.
"Remote Procedure Call", Retrieved from: http://web.archive.org/web/20170713091124/https://msdn.microsoft.com/en-us/library/windows/desktop/aa378651(v=vs.85).aspx, Jul. 13, 2017, 2 Pages.
"Routing and Remote Access Service", Retrieved from: https://docs.microsoft.com/en-us/previous-versions/windows/it-pro/windows-server-2008-R2-and-2008/dd469790(v=ws.11)?redirectedfrom=MSDN, Nov. 25, 2009, 2 Pages.
"Virtual Network", Retrieved from: https://azure.microsoft.com/en-us/services/virtual-network/, Retrieved Date Dec. 16, 2019, 10 Pages.
"Virtual Private Cloud (VPC)", Retrieved from: http://web.archive.org/web/20170512142425/https://cloud.google.com/vpc/, May 12, 2017, 7 Pages.
"VPN Gateway", Retrieved from: https://web.archive.org/web/20170128184239/https://azure.microsoft.com/en-us/services/vpn-gateway/, Jan. 28, 2017, 5 Pages.

Baset, et al., "Towards an Understanding of Oversubscription in Cloud", In Proceedings of the 2nd USENIX Conference on Hot Topics in Management of Internet, Cloud, and Enterprise Networks and Services, Apr. 24, 2012, 6 Pages.
Bobroff, et al., "Dynamic Placement of Virtual Machines for Managing SLA Violations", In Proceedings of 10th IFIP/IEEE International Symposium on Integrated Network Management, May 21, 2007, pp. 119-128.
Clark, et al., "Live Migration of Virtual Machines", In Proceedings of 2nd Conference on Symposium on Networked Systems Design & Implementation, vol. 2, May 2, 2005, pp. 273-286.
Cully, et al., "Remus: High Availability via Asynchronous Virtual Machine Replication", In Proceedings of the 5th USENIX Symposium on Networked Systems Design and Implementation, Apr. 16, 2008, pp. 161-174.
Eisenbud, et al., "Maglev: A Fast and Reliable Software Network Load Balancer", In Proceedings of 13th USENIX Symposium on Networked Systems Design and Implementation, Mar. 16, 2016, pp. 523-535.
Gandhi, et al., "Duet: Cloud Scale Load Balancing with Hardware and Software", In Proceedings of ACM Conference on Special Interest Group on Data Communication, Aug. 17, 2014, pp. 27-38.
Gandhi, et al., "Yoda: A Highly Available Layer-7 Load Balancer", In Proceedings of Eleventh European Conference on Computer Systems, Apr. 18, 2016, 16 Pages.
Garey, et al., "Worst-Case Analysis of Memory Allocation Algorithms", In Proceedings of Fourth Annual ACM Symposium on Theory of Computing, May 1, 1972, pp. 143-150.
Gember-Jacobson, et al., "OpenNF: Enabling innovation in network function control", In Proceedings of the ACM Conference on SIGCOMM, Aug. 17, 2014, 12 Pages.
Kablan, et al., "Stateless Network Functions", In Proceedings of the ACM SIGCOMM Workshop on Hot Topics in Middleboxes and Network Function Virtualization, Aug. 17, 2015, pp. 49-54.
Kaufman, et al., "Internet Key Exchange Protocol Version 2 (IKEv2)", Retrieved from: http://www.rfc-editor.org/in-notes/pdfrfc/rfc5996.txt.pdf, Sep. 2010, 138 Pages.
Kent, S., "IP Encapsulating Security Payload (ESP)", Retrieved from: http://www.rfc-editor.org/rfc/rfc4303.txt, Dec. 2005, 36 Pages.
Mao, et al., "A performance study on the VM startup time in the cloud", In Proceedings of IEEE 5th International Conference on Cloud Computing, Jun. 24, 2012, pp. 423-430.
Mcguire, Cheryl, "Planning and design for VPN Gateway", Retrieved from: https://web.archive.org/web/20190113225710/https://docs.microsoft.com/en-us/azure/vpn-gateway/vpn-gateway-plan-design, Jul. 27, 2017, 8 Pages.
Palkar, et al., "E2: A Framework for NFV Applications", In Proceedings of the 25th Symposium on Operating Systems Principles, Oct. 4, 2015, pp. 121-136.
Panda, et al., "NetBricks: Taking the V out of NFV", In Proceedings of the 12th USENIX conference on Operating Systems Design and Implementation, Nov. 2, 2016, 14 Pages.
Patel, et al., "Ananta: Cloud Scale Load Balancing", In Proceedings of the ACM SIGCOMM conference on SIGCOMM, Aug. 12, 2013, pp. 207-218.
Paxson, Vern, "Bro: A System for Detecting Network Intruders in Real-Time", In Proceedings of the 7th USENIX Security Symposium, Jan. 26, 1998, 22 Pages.
"International Search Report and Written Opinion Issued in PCT Application No. PCT/US2018/030333", dated Nov. 14, 2018, 14 Pages.
Rajagopalan, et al., "Pico Replication: A High Availability Framework for Middleboxes", In Proceedings of the 4th annual Symposium on Cloud Computing, Oct. 1, 2013, 16 Pages.
Rajagopalan, et al., "Split/Merge: System Support for Elastic Execution in Virtual Middleboxes", In Proceedings of the 10th USENIX conference on Networked Systems Design and Implementation, Apr. 2, 2013, pp. 227-240.
Sekar, et al., "Design and Implementation of a Consolidated Middlebox Architecture", In Proceedings of the 9th USENIX conference on Networked Systems Design and Implementation, Apr. 25, 2012, 14 Pages.

(56) References Cited

OTHER PUBLICATIONS

Sherry, et al., "Rollback-Recovery for Middleboxes", In Proceedings of the ACM Conference on Special Interest Group on Data Communication, Aug. 17, 2015, pp. 227-240.

Singh, et al., "Towards VM Consolidation Using a Hierarchy of Idle States", In Proceedings of the 11th ACM SIGPLAN/SIGOPS International Conference on Virtual Execution Environments, Mar. 14, 2015, 13 Pages.

Strom, et al., "Optimistic Recovery in Distributed Systems", In Journal of ACM Transactions on Computer Systems, vol. 3, No. 3, Aug. 1985, pp. 204-226.

Urgaonkar, et al., "Resource Overbooking and Application Profiling in Shared Hosting Platforms", In Proceedings of the 5th symposium on Operating systems design and implementation, vol. 36, Issue SI, Dec. 31, 2002, pp. 239-254.

Verma, et al., "Virtual Machine Consolidation in the Wild", In Proceedings of the 15th International Middleware Conference, Dec. 8, 2014, pp. 313-324.

Voorsluys, et al., "Cost of Virtual Machine Live Migration in Clouds: A Performance Evaluation", In Proceedings of the 1st International Conference on Cloud Computing, Dec. 1, 2009, 12 Pages.

Wood, et al., "Black-box and Gray-box Strategies for Virtual Machine Migration", In Proceedings of the 4th USENIX conference on Networked systems design & implementation, Apr. 11, 2007, 14 Pages.

Zhang, et al., "Virtual Machine Migration in an Over-committed Cloud", In Proceedings of IEEE Network Operations and Management Symposium, Apr. 16, 2012, pp. 196-203.

"PRADS—Passive Real-time Asset Detection System", Retrieved from: http://manpages.ubuntu.com/manpages/trusty/manl/prads.1.html, Retrieved Date: Dec. 15, 2019, 3 Pages.

Greenberg, Albert, "Windows Azure: Scaling SDN in the Public Cloud", Retrieved from: https://www.slideshare.net/opennetsummit/ons2014-albert-greenbergmicrosoft, Mar. 23, 2015, 12 Pages.

"Office Action Issued in European Patent Application No. 18727098.8", dated Oct. 4, 2021, 6 Pages.

"First Office Action and Search Report Issued in Chinese Patent Application No. 201710401488.2", dated Jul. 30, 2020, 24 Pages.

"Second Office Action Issued in Chinese Patent Application No. 201710401488.2", dated Feb. 7, 2021, 06 Pages.

\* cited by examiner

DISTRIBUTED IPSEC GATEWAY

CROSS-REFERENCE TO RELATED APPLICATION

This application is a U.S. National Stage Filing under 35 U.S.C. 371 of International Patent Application Serial No. PCT/US2018/030333, filed May 1, 2018, and published as WO 2018/222323 A1 on Dec. 6, 2018, which claims priority to Chinese Application No. 201710401488.2, filed May 31, 2017, which applications and publication are incorporated herein by reference in their entirety.

BACKGROUND

Virtual cloud network service may offer cloud users their own private networks (hereafter referred as virtual private cloud network) on a public cloud (a cloud network of a cloud provider). In the field of cloud technique, IPsec (Internet Protocol Security) gateway may provide the cloud users of a cloud tenant with VPN (Virtual Private Network) connection for remotely accessing their virtual private cloud network.

BRIEF SUMMARY

The embodiments of the present disclosure are provided to give a brief introduction to some concepts, which would be further explained in the following description. This Summary is not intended to identify essential technical features or important features of the subject as claimed nor to limit the scope of the subject as claimed.

A technical solution related to distributed IPSec gateway is disclosed. A control plane and a data plane of the IPSec gateway may be divided, a plurality of gateway processing nodes may be run in the data plane to process data packets of incoming ESP (Encapsulating Security Payload)/AH (Authentication Header) traffic and/or data packets of outgoing IP traffic. IKE (Internet Key Exchange) information interaction may be handled in the control plane and the traffic may be steered on each gateway processing nodes in the data plane.

The above description is merely a brief introduction of the technical solutions of the present disclosure, so that the technical means of the present disclosure may be clearly understood, and implemented according to the description of the specification, and the above and other technical objects, features and advantages of the present disclosure may be more obvious based on the embodiments of the present disclosure as follows.

DETAILED DESCRIPTION

In the following, description will be given in detail on the exemplary embodiments of the present disclosure, in connection with the accompanying drawing. Although drawings show the exemplary embodiments of the present disclosure, it should be appreciated that the present disclosure may be implemented in various ways without being limited by the embodiments set forth herein. On the contrary, these embodiments are provided for thorough understanding of the present disclosure, and completely conveying the scope of the present disclosure to the skills in the art.

Explanation for Terms

IPSec: Internet Protocol Security, which is an open standard block structure using encrypted safety services to ensure confidential and safety communication over an Internet protocol (IP) network.

ESP: Encapsulating Security Payload.

AH: Authentication Header.

SA: Security Association.

IKE: Internet Key Exchange Protocol.

IP: Internet Protocol.

SPI: Security Parameter Index.

DH: Diffie-Hellman, which is a type of key agreement algorithm.

Nonce: Number used once, which is any or non-repetitive random number that can be used only once.

In the present disclosure, term "technique" may refer to, for example, system(s), method(s), computer-readable instructions, module(s), algorithm, hardware logic (e.g., Field-Programmable Gate Array (FPGA)), Application Specific Integrated Circuit (ASIC), Application Specific Standard Parts (ASSP), System on Chip (SOC), Complex Programmable Logic Device (CPLD), and/or other technique allowable in the above context and the present disclosure.

Figure 1:
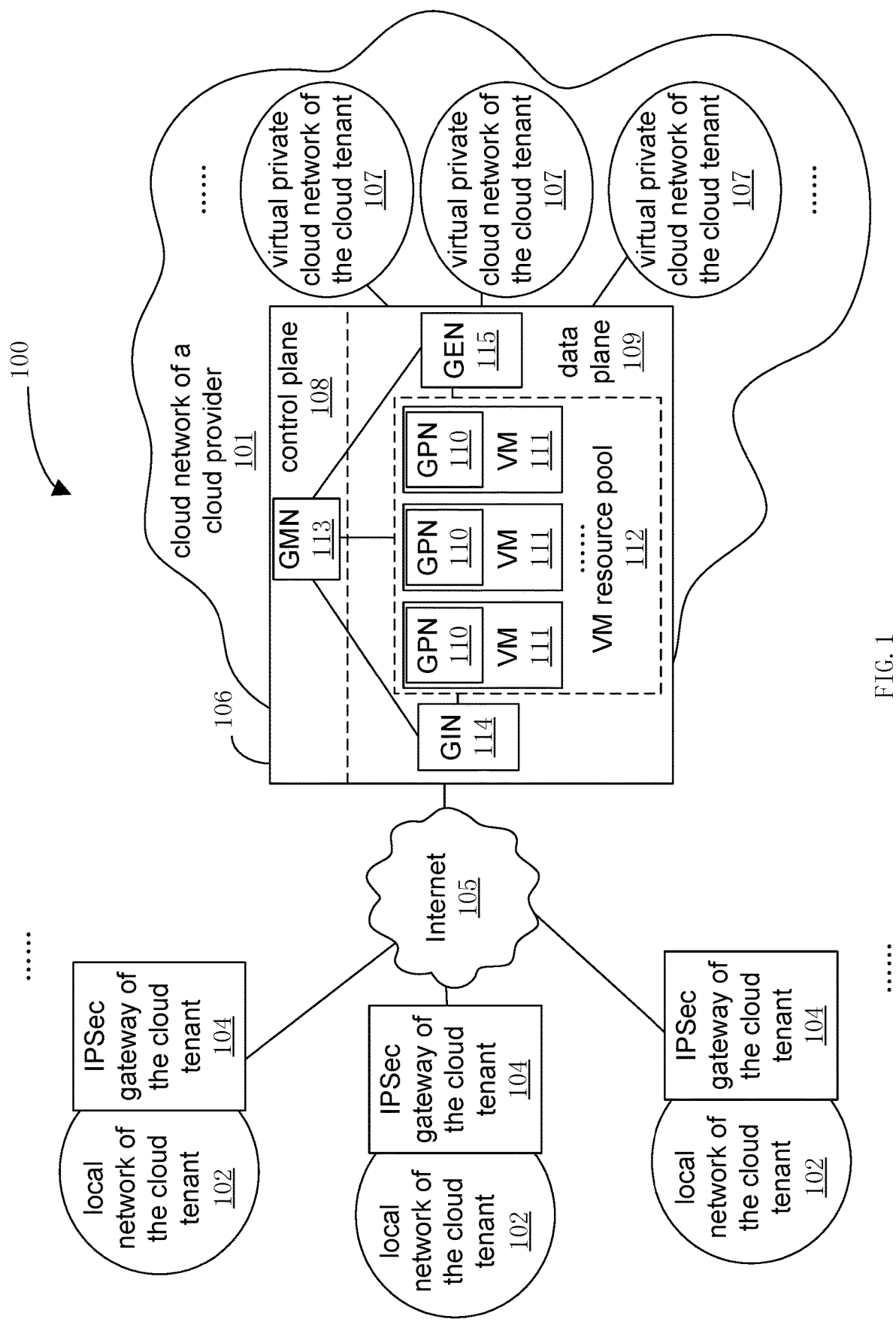
FIG. 1 is a block diagram of a cloud network system of distributed IPSec gateway of embodiments of the present disclosure.

FIG. 1 shows a block diagram 100 of a cloud network system of distributed IPSec gateway of embodiments of the present disclosure. In the block 100 shown in FIG. 1, a cloud network 101 of a cloud provider and local networks 102 of a plurality of cloud tenants are included. In the cloud network 101 of the cloud provider, virtual private cloud networks 107 of cloud tenants rent by a plurality of cloud tenants are included. The local networks 102 of the cloud tenant may access Internet 105 via an IPSec gateway 104 of the cloud tenant, and then may access the virtual private cloud network 107 of the cloud tenant via an distributed IPSec gateway 106 of the cloud provider, so that an IPSec tunnel may be established between the local network 102 of the cloud tenant and the virtual private cloud network 107 of the cloud tenant for VPN connection between the local network 102 of the cloud tenant and the virtual private cloud network 107 of the cloud tenant.

In the technical solution provided in the present disclosure, the IPSec gateway of the cloud provider is an distributed IPSec gateway, which may use a structure in which a control plane 108 and a data plane 109 are separated. In the data plane 109, a plurality of GPNs (Gateway Processing Node) 110 are provided, and each GPN may be run by a VM (Virtual Machine) 111 to process data packets of incoming ESP/AH traffic and/or data packets of outgoing IP traffic of at least one IPSec tunnel. In some examples, the data plane 109 may be provided with VM resource pool 112, in which VMs 111 may be used to run the GPNs 110 as described above.

In the control plane 108, a GMN (Gateway Management Node) 113 may be provided to perform message exchanges with IPSec gateways 104 of a plurality of tenants to generate IPSec SAs of a plurality of IPSec tunnels and send the same to the GPN 110 for processing data packets of respective IPSec tunnel. Furthermore, the GMN 113 may steer traffic on each GPN 110 in the data plane 109 to adjust loads of data packets of IPSec tunnels being processed by each GPN so as to maximize the utilization of VM resource. More particularly, the GMN 113 may perform traffic steering on the traffic of IPSec tunnel of data plane 109 by generating traffic steering rules, and the generated traffic steering rules may be sent to GIN (Gateway Ingress Node) 114 and GEN (Gateway Egress Node) 115 of the data plane 109 and the GIN 114 and GEN 115 may perform the traffic steering according to the traffic steering rules.

In the following, detailed description would be made on each component of the cloud network system of the distributed IPSec gateway and primary data processing procedure of the embodiments of the present disclosure.

IPSec Tunnel

Figure 2:
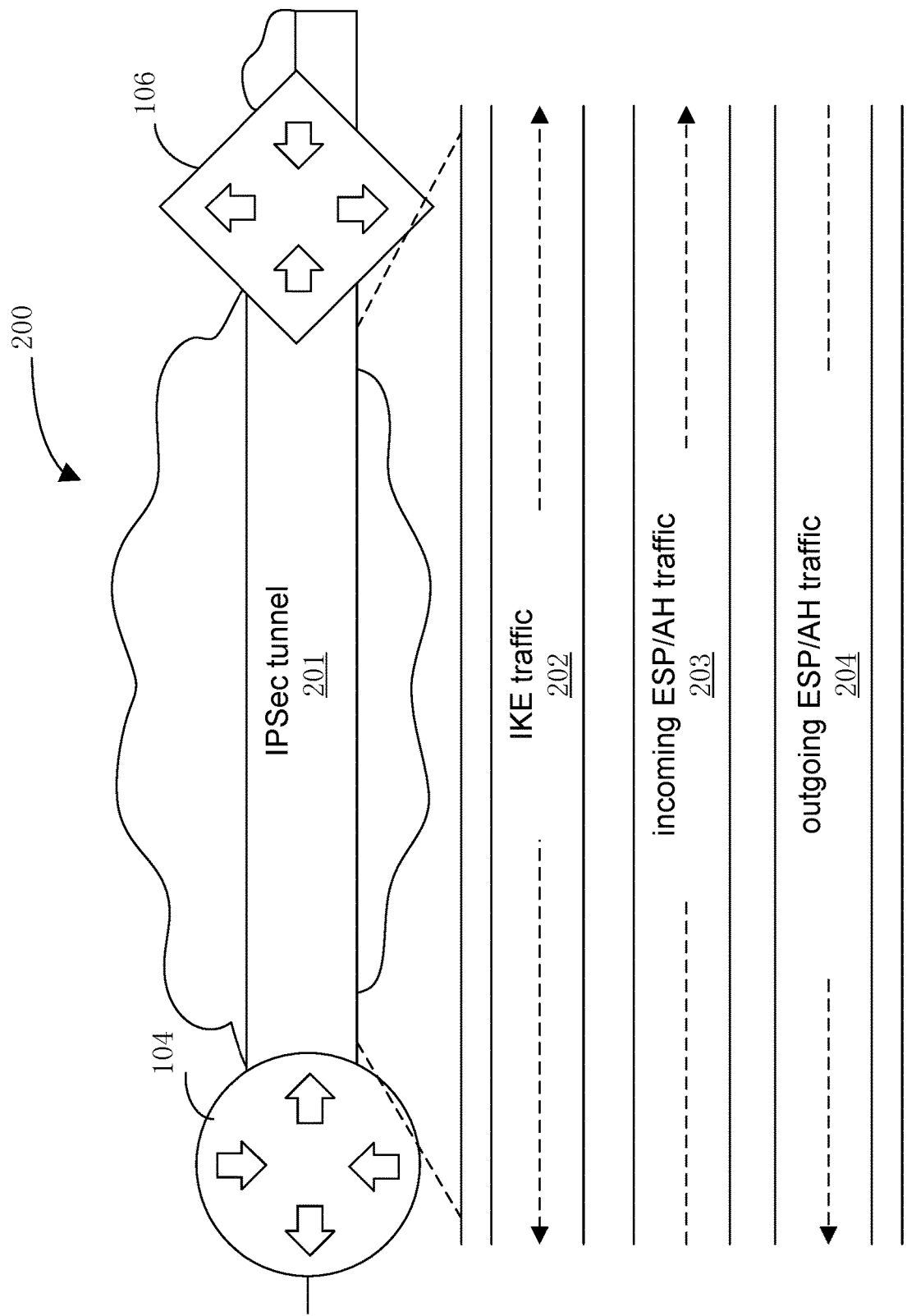
FIG. 2 is a schematic diagram showing IPSec tunnels.

FIG. 2 shows a schematic diagram 200 showing IPSec tunnels. The IPSec tunnel 201 may be established between the IPSec gateway 104 of the cloud tenant and the distributed IPSec gateway 106 of the cloud provider. IKE traffic 202 and ESP/AH traffic may be transferred in the IPSec tunnel 201. The ESP/AH traffic may be divided into incoming ESP/AH traffic 203 and outgoing ESP/AH traffic 204 in figures, since the ESP/AH traffic is encrypted and decrypted by unidirection IPSec SAs (including incoming IPSec SAs and outgoing IPSec SAs).

IPSec protocol is a kind of standard for site-to-site VPN connection. The IPSec protocol may ensure secure communication between peer IPSec gateways by authenticating and encrypting IP packets. For site-to-site VPN connection, an IPSec gateway may encrypt IP packets, and transfer the encrypted IP packets between two peers IPSec gateways, so as to form an IPSec tunnel. The IPSec protocol primarily consists of two protocols: IKE and ESP/AH, which would be explained in the following.

The main purpose of IKE protocol is to make authentication between two peer IPSec gateways and setup the shared attributes between the two peer IPSec gateways for secure communication. A set of those shared attributes may be called a security association (SA), which may be generated by negotiation between the IPSec gateways. The SA may include a cipher suite and a symmetric key.

Two kinds of SAs, IKE SA and ESP/AH SA, may be generated by message exchanges between the IPSec gateways. The IKE SA may be generated by initial message exchanges between the IPSec gateways, and may be used to encrypt and decrypt bidirectional IKE traffic 202. Upon the IKE SA is generated, the message exchanges between the IPSec gateways may be encrypted by IKE SA and the message exchanges encrypted by the IKE SA may be called IKE message exchanges. An IPSec SA (also referred as CHILD SA) may be further generated by further IKE message exchanges. The IPSec SA may be used to encrypt and decrypt the ESP/AH traffic and include incoming IPSec SA for decrypting data packets of incoming ESP/AH traffic and outgoing IPSec SA for encrypting data packets of outgoing IP traffic.

The ESP/AH protocol may be used to encrypt and decrypt data packets transferred between IPSec gateways by using the IPSec SA so as to ensure confidentiality, integrity and data origin authenticity. The outgoing IPSec SA may be used to encrypt the data packets of outgoing IP traffic from a virtual private cloud network 107 of a cloud tenant to generate data packets of outgoing ESP/AH traffic 204 and transfer the same to an IPSec gateway 104 of the cloud tenant through an IPSec tunnel. The data packets of incoming ESP/AH traffic from the IPSec gateway 104 of the cloud tenant may be decrypted by using the incoming IPSec SA to generate data packets of incoming IP traffic and transfer the same to the virtual private cloud network 107 of the cloud tenant.

The general structure of the IPSec tunnel has been described above and description would be made on the control plane 108 and data plane 109 of the distributed IPSec gateway 106 of embodiments of the present disclosure.

Structure of IPSec Gateway

In a conventional IPSec gateway system, in a cloud network of a cloud provider, in one aspect, to provide each cloud tenant with IPSec tunnel connection from local network to virtual private cloud network, the cloud provider may provide each cloud tenant with an IPSec gateway, which may be run by a VM. The VM allocated to each cloud tenant to run the IPSec gateway may be isolated from another and cannot be shared, and should meet the requirement of peak VPN traffic promised in the agreement with the cloud tenant. On the other hand, cloud tenants may have different usages of their own virtual private cloud networks. Even for the same cloud tenant, in different time periods, the usages of virtual private cloud network are different. Therefore, the VM resources allocated to each cloud tenant may be not fully used and even result in significant resource waste.

With reference to FIG. 1, an IPSec gateway provided on the cloud network 101 of the cloud provider of the embodiments of the present disclosure may achieve a distributed IPSec gateway 106 by separating the control plane 108 and the data plane 109. More particularly, the IPSec tunnels of a plurality of cloud tenants may be grouped to one distributed IPSec gateway 106 for processing so that the traffics of each IPSec tunnel may be processed in a distributed way by a plurality of VMs 111 of the data plane 109 and reasonable control may be performed by the control plane 108 so as to maximize the usage of VM resources.

As shown in FIG. 1, the distributed IPSec gateway 106 of the embodiments of the present disclosure may be generally divided into control plane 108 and data plane 109. The control plane 108 may include a GMN, and the data plane 109 may include a gateway input node 114 and a gateway output node 115 and a plurality of GPNs 110. The GPNs 110 may be run by the VMs 111 in a VM resource pool 112. In the structure of the distributed IPSec gateway 106 of embodiments of the present disclosure, the GPNs 110 and the VMs 111 for running the GPNs 110 in the data plane 109 would not belong to tenants any longer, but be allocated by the GMN 113 according to the number of the IPSec tunnels and data packets in the IPSec tunnels. In the following, explanation would be made on the control plane 108 and the data plane 109 of the distributed IPSec gateway 106.

The Control Plane of the Distributed IPSec Gateway

The control plane 108 of the distributed IPSec gateway 106 may include a GMN 113 and the functions of the GMN 113 may include the following:

(1) generating IKE SA and IPSec SA by message exchanges with the IPSec gateway 104 of the cloud tenant and sending the IPSec SA to the GPN 110 of the data plane 109.

Upon a new IPSec tunnel is established initially, the GMN 113 may firstly perform message exchanges with the IPSec gateway 104 of the cloud tenant to generate an IKE SA of the IPSec tunnel corresponding to the IPSec gateway 104 of the cloud tenant, and perform further IKE message exchanges with the IPSec gateway 104 of the cloud tenant by using the IKE SA of the IPSec tunnel to generate IPSec SA of the IPSec tunnel. Then, the IPSec SA may be sent to the GPN 110 for processing the traffic of the IPSec tunnel.

For the established IPSec tunnel, keys would be updated periodically. During the updating of the keys, the above message exchanges with the IPSec gateway 104 of the cloud tenant may be also performed to generate new IKE SA and IPSec SA and send the new IPSec SA to the GPN 110 of the data plane 109. In some examples, the IKE SA and the IPSec SA may use different key updating periods. More particularly, the updating period for the IPSec SA may be shorter than that for the IKE SA.

Furthermore, in the case that the GPN 110 fails to work or there is something wrong with the transfer for the established IPSec tunnels, the establishing for the IPSec tunnel may be performed again, so that the above procedures in which message exchanges with the IPSec gateway 104 of the cloud tenant are performed to generate the IKE SA and IPSec SA and send the IPSec SA to the GPN 110 of the data plane 109 would happen.

(2) traffic steering is made on a plurality of GPNs 110 of the data plane 109.

In some examples, the traffic steering may be performed in a way that: the GMN 113 may generate traffic steering rules and send the rules to the gateway input node 114 and/or gateway output node 115 of the data plane 109, so as to achieve the traffic steering. More particularly, the traffic steering rules may include incoming ESP/AH traffic steering rules and/or outgoing IP traffic steering rules.

The GMN 113 may send the incoming ESP/AH traffic steering rules, which may be used to determine by which GPN 110 the incoming ESP/AH traffic of each IPSec tunnel should be processed, to a gateway input node 114, and the gateway input node 114 may forward data packets of the incoming ESP/AH traffic of some IPSec tunnel to the GPN 110 for processing the incoming ESP/AH traffic of that IPSec tunnel according to the incoming ESP/AH traffic steering rules upon receiving the data packets of the incoming ESP/AH traffic.

In some examples, the incoming ESP/AH traffic steering rules may include a matching relationship between SPI (Security Parameter Index) and IP addresses of GPNs 110. The SPI may be generated during negotiation of IPSec SA and may be used to identify the key used by the data packets of this ESP/AH traffic. The SPI may be contained in the data packets of the incoming ESP/AH traffic.

The GMN 113 may send the outgoing IP traffic steering rules, which may be used to determine the outgoing IP traffic from each virtual private cloud network 107 should be transferred through which IPSec tunnel, i.e., to which GPN 110 the outgoing IP traffic should be steered for processing, to the gateway outgoing node 115. The gateway outgoing node 115 may forward the data packets of the outgoing IP traffic from some virtual private cloud network 107 to a GPN 110 for processing the outgoing IP traffic of corresponding IPSec tunnel upon receiving the data packets of that outgoing IP traffic.

In some examples, the outgoing IP traffic steering rules may include matching relationship between network information of Traffic Selectors and IP addresses of GPNs 110. More particularly, the network information of the Traffic Selectors may include some basic information which may identify network stream, and such information may be also used to determine the outgoing IP traffic may be transferred through which IPSec tunnel, and may include, for example, quintuple information of data packet: source IP address, destination IP address, source port, destination port, and protocol type.

The GMN 113 may generate the traffic steering rules and send the same upon establishment of the IPSec tunnel or migrating of the IPSec tunnel. Furthermore, with respect to the incoming ESP/AH traffic steering rules, the SPI may be updated upon updating of the keys, and thus the GMN 113 may also generate new incoming ESP/AH traffic rules and send them to the gateway input node 114 after updating of keys.

(3) balancing on loads of the GPNs 110 of the data plane 109.

In some examples, the GMN 113 may monitor loads of VMs 111 running respective GPNs 110. Based on the monitoring on loads of each VM 111, the GMN 113 may perform the following operations:

Upon establishing a new IPSec tunnel, the GMN 113 may select the GPN 110 run by a VM 111 having load redundancy in the data plane 109 to process the traffic of the newly established IPSec tunnel, and send the generated IPSec SA to this GPN 110. Furthermore, the GMN 113 may further update the traffic steering rules and send the new traffic steering rules to the gateway input node 114 and/or the gateway output node 115, so that the traffic of the new IPSec tunnel may be steered to corresponding GPN 110.

The GPN 110 may determine whether or not it is necessary to perform migrating of IPSec tunnel according to the loads of VM 111. If the loads of some VM 111 running GPN 110 are beyond a preset load threshold, the migrating control of IPSec tunnel may be launched to migrate the IPSec tunnel to the GPN 110 of the VM 111 having loads redundancy.

Furthermore, upon a new IPSec tunnel is being established or it is necessary to perform migrating of IPSec tunnel, if the GMN 113 fails to find a VM 111 having loads redundancy, the GMN 113 may request new VM resources to the cloud provider to run a new GPN 110 to process the traffic of the IPSec tunnel.

(4) adjusting the allocating of the VM resources of the VM resource pool 112.

In some examples, the data plane 109 may include a VM resource pool 112 for running GPNs 110 and each GPN 110 may be run by one VM 111 in the VM resource pool 112. Considering volatility of the traffic of the IPSec tunnel and the volatility of the number of the IPSec tunnels, in some examples, the number of the VMs 111 in the VM resource pool 112 may be configured to be larger than the number of GPNs 110. The VM resource pool 112 may include VMs 111 in the following states: active VMs, which are booted and being used for running GPN 110; inactive VMs, which are booted and ready for running GPN 110; and shutdown VMs. More particularly, the inactive VM 111 is a VM in a standby state and reserved for scaling out the service capacity of the VM resource pool 112. Such VMs 111 have been booted and thus can instantly run new GPN 110 without the procedure of booting the VMs.

Based on such solution for VM resource pool 112, the GPN 110 may perform switching among the states of one or more VMs 111 according to the incoming ESP/AH traffic and/or outgoing IP traffic of established each IPSec tunnel and loading capability of VMs 111.

The states switching of VMs 111 may include at least the following cases:

Case 1: There may be volatility in the data transfer between local network 102 of a cloud tenant and the virtual private cloud network 107 (depending on the usage of virtual private cloud network 107 by the cloud tenant), and therefore, there may be volatility in the incoming ESP/AH traffic and/or outgoing IP traffic of the IPSec tunnel.

When the loads capability of the active VMs 111 cannot meet the requirements of the incoming ESP/AH traffic and/or outgoing IP traffic of each established IPSec tunnel, it may be necessary to add more active VMs 111 to run new GPNs 110 to share the burden of the incoming ESP/AH traffic and/or outgoing IP traffic of each established IPSec tunnel. In such case, it is possible to select one or more inactive VMs 111 in the VM resource pool 112 to run the new GPN 110 so as to switch the one or more inactive VMs 111 to active VMs 111. After the running of the new GPNs 110, some established IPSec tunnels may be migrated to the new GPNs 110 so as to share the burden the existing incoming ESP/AH traffic and/or outgoing IP traffic of IPSec tunnels.

On the other hand, when one or more one or more active VMs 111 has relatively large loads redundancy in loads capability, adjustment may be made on IPSec tunnels by means of IPSec tunnel migrating mechanism, so that the number of IPSec tunnel being processed by the one or more active VMs 111 is zero, and the one or more active VMs 111 may be switched to inactive VMs 111. Furthermore, when the IPSec tunnel processed by some active VM 111 is shutdown, the active VM 111 may be switched to inactive VM 111.

Case 2: in the case that it is necessary to establish a new IPSec tunnel, when the loads redundancy of active VMs 111 cannot meet the requirements for processing the traffic of the new IPSec tunnel, or in the case that it is necessary to migrate the IPSec tunnel, when the loads redundancy of active VMs 111 cannot meet the requirements for processing the traffic of the IPSec tunnel being migrated, the GPN 110 may select an inactive VM 111 to run the new GPN 110, so as to switch the inactive VM 111 into active VM 111, to increase the processing capability for processing the traffic of the IPSec tunnel. Upon the new GPN 110 is running, it can be used to process the incoming ESP/AH traffic and/or outgoing IP traffic of the new IPSec tunnel or the migrated IPSec tunnel.

In the following, description would be made on the algorithm model of the resource configuration management of the VM resource pool 112.

TABLE 1 explanation on related parameters in the above algorithm model

| parameters | Explanation |
|---|---|
| $\sigma_i$ | Maximum resource amount of VMs, which can be used by IPSec tunnel i |
| $\alpha_i$ | Current resource amount of VMs currently used by IPSec tunnel i |
| $\beta_j$ | Current resource amount of VMs currently used by GPN j |
| $U_i$ | Probability distribution of the resource amount of VMs used by IPSec tunnel i |
| $\varepsilon$ | Throughput guarantee violation tolerance |
| Y | Probability distribution of aggregated resource amount of VMs used by all IPSec tunnels |
| C | resource amount of all VMs in the VM resource pool |
| $T_H$ | Loads threshold for VM |

In the above distributed IPSec gateway, the traffic of each IPSec tunnel may be processed by one GPN 110, and one GPN 110 may process the traffics of a plurality of IPSec tunnels. The processing capability of each GPN 110 may depend on the loads capability of the VM 111 running that GPN 110. The resource amount of the VM mentioned in the table reflects the resources configured for the VM 111 by the cloud provider, and may include, for example, performance index of processor of VM, memory capacity of VM, and so on. The resource amount referred herein is to facilitate the evaluation the processing capability of the VM and make quantization on the resource configuration of VM. The specific ways for the quantization may depend on actual needs without being limited herein. The resource amount may determine the loads capability of the VM.

To explain the above algorithm model, it is assumed that each VM 111 in the VM resource pool 112 may have the same loads capability, and the loads capability of the VM 111 running each GPN 110 may be normalization to 1.

Maximum resource amount σ of VM available for each IPSec tunnel There is limitation on the maximum resource amount of VM 111 available for each IPSec tunnel. In some examples, the limitation on the traffic of IPSec tunnels may be defined in the service agreement agreed between the cloud provider and the cloud tenant. In the case that the limitation on the traffic of the IPSec tunnel is determined, the maximum resource amount of VM 111 available for that IPSec tunnel may be determined. In the above algorithm model, the maximum resource amount of VM 111 available for IPSec tunnel may be expressed with a. In some GPN 110, it may be assumed that the number of the IPSec tunnels processed by the GPN 110 is m, for one IPSec tunnel i (i is a positive integer and 1≤i≤m), the maximum resource amount of VM 111 available for it may be expressed with $\sigma_i$, and because the loads capability of the VM 111 running each GPN 110 may be normalization to 1, the range of the $\sigma_i$ may be 0<$\sigma_i$<1

Resource amount β of VMs currently used by GPN 110

In the GPN 110, the resource amount of VMs currently used by each IPSec tunnel may be calculated periodically. For example, in the GPN 110, resource amount α of VMs currently used by each IPSec tunnel being processed by the GPN 110 may be calculated every period of τ. It may be assumed that the resource amount of the VM 111 currently used by one IPSec tunnel i (1≤i≤m) is $\alpha_i$, and the total number of the GPNs in the IPSec gateway is p, the resource amount of the VMs 111 currently used by the $GPN_j$ (1≤j≤p) may be calculated according to the following formula:

$$\beta_j = \sum_{i=1}^{m} \alpha_i \quad (1)$$

Probability distribution U of the resource amount of VMs used by IPSec tunnel Considering that the resource amount of VMs used by IPSec tunnel may change as time goes, probability distribution $U_i$ of the resource amount of VM 111 used by IPSec tunnel i may be introduced. The $U_i$ is the probability density function of the $\alpha_i$, and can be expressed as $U_i(x)$ (0<x<$\alpha_i$) so as to identify the resource amount of the VM 111 probably used by one IPSec tunnel i at a certain time.

Throughput guarantee violation tolerance ε

In the service agreement agreed between the cloud tenant and the cloud provider, the cloud provider may make a promise about the throughput of the IPSec tunnel, and the probability for failing to offer the throughput promised in the service agreement acceptable to the cloud tenant, i.e., the throughput guarantee violation tolerance ε. For example, ε=0.01 means that the distributed IPSec gateway 106 should have 99% of effective time for guaranteeing the performance of the IPSec gateway, i.e., the distributed IPSec gateway 106 should guarantee the promised throughput in 99% of the effective time. If packets lost due to insufficient load capability of VM 111 running GPN 110 in some period (i.e., the GPN 110 have insufficient VM resource), so that the traffic of the IPSec tunnel does not reach the promised throughput, the distributed IPSec gateway 106 should guarantee the sum of all such periods should account for less than ε of the total available time.

Probability distribution Y of aggregated resource amount of VMs used by all IPSec tunnels It may be assumed that the number of all IPSec tunnels in the IPSec gateway is n, the probability distribution Y of aggregated resource amount of VMs 111 used by all IPSec tunnels may be calculated by summing up the probability distribution U of resource amount of VM 111 used by each IPSec tunnel according to the following formula:

$$Y = \sum_{i=1}^{n} U_i \qquad (2)$$

Since U is a discrete probability distribution, the probability distributions of resource amount used by IPSec tunnels are independent from each other. Based on formula (2), it is possible to calculate the convolution of resource amount of VMs 111 used by any two IPSec tunnels according to the following formula:

$$Y(z) = \sum_{k=0}^{n} U(k)U(z-k) \qquad (3)$$

More particularly, U(k) is the probability distribution of resource amount used by the $k^{th}$ IPSec tunnel, n is the number of all IPSec tunnels in the IPSec gateway, z is the variety of the convolution Y. When z=n, the probability distribution Y of aggregated resource amount of VMs 111 used by all IPSec tunnels may be obtained by summing up the n IPsec tunnels recursively according to the above formula (3).

Minimum number of resource amount of VMs

When it is guaranteed that the probability Pr for throughput guarantee violation is less than the tolerance ε, the minimum number of resource amount of VMs 111 which should be configured in the VM resource pool 112 may be calculated according to the following formula:

$$Pr(Y>C) \leq \varepsilon \qquad (4)$$

More particularly, C is the total resource amount of VMs 111 in the VM resource pool 112. As described above, in the above algorithm model, it is assumed that the VMs 111 in the VM resource pool 112 may have same loads capability, and the loads capability of each VM 111 may be normalization to 1. Therefore, C may be the number of the VMs 111 configured in the VM resource pool 112. ε is a preset number (pre-determined in the service agreement), Y may be calculated according to the formula (2) or (3). Therefore, the number C of VMs 111 necessary to be configured may be calculated. The C calculated according to the above formula (4) is the minimum value for guaranteeing that the probability for throughput guarantee violation is less than the tolerance ε. In embodiments of the present disclosure, the number of actually configured VMs 111 may be larger than C so as to make the probability for throughput guarantee violation less than tolerance ε, so that the requirement on the throughput of the IPSec tunnels from the cloud tenant may be met.

As described above, the above VM resource pool 112 may include active VMs 111, inactive VMs 111, and shutdown VMs 111. Since it may need some time to active the shutdown VMs 111, in some example, to better guarantee the throughput promise, C may be defined as the total number of the active VMs 111 and inactive VMs 111 configured in the VM resource pool 112. Therefore, in embodiments, the total number of active VMs 111 and inactive VMs 111 is larger than C by dynamically adjusting the status of VMs 111, so that the requirement on the throughput of the IPSec tunnels from the cloud tenant may be met better.

With the above algorithm model, in condition that the probability for throughput guarantee violation less than tolerance ε is guaranteed, it is possible to configure less VMs 111 so as to optimize the usage of VM resource.

Furthermore, in some examples, the loads threshold $T_H$ for VM 111 ($T_H$ is less than 1, e.g., set as 90%) may be further considered, and the total number of active VMs 111 and inactive VMs 111 which should be configured in the VM resource pool 112 should be larger than $C/T_H$, so as to better guarantee the requirements on the throughput of IPSec tunnel from the cloud tenant.

(5) Control on Migration of IPSec Tunnel

Triggering Conditions of IPSec Tunnel

The GMN 113 may monitor the loads of VMs 111. When it is found that the total traffic of the IPSec tunnels processed by the GPN 110 run in the VM 111 is beyond the loads threshold $T_H$ for that VM 111, the control on the migration of the IPSec tunnel may be launched and one or more IPSec tunnels of the plurality of IPSec tunnels processed by that GPN 110 may be migrated to the GPN 110 run by the VM 111 having load redundancy, so as to balance the loads of VMs 111.

Hotspot GPN 110 Detection

Upon setting the loads threshold $T_H$ for the VM 111, the loads threshold $T_H$ may be set as being larger than the largest a in all IPSec tunnels of IPSec gateway, so as to guarantee the GPN 110 run by that VM 111 to have good running efficiency.

If the GMN 113 finds the resource amount $\beta_j$ of a VM 111 currently used by some GPN 110 is larger than $T_H$, the GPN 110j may be regarded as a GPN 110 which needs the IPSec tunnel migration (hereafter referred as hotspot GPN 110). Upon determining the hotspot GPN 110, one or more IPSec tunnels of the hotspot GPN 110 may be migrated to the GPN 110 run by VM 111 having loads redundancy (hereafter referred as relatively free GPN 110), so that $\beta_j$ is less than $T_H$.

To minimize the number of migration of IPSec tunnels, the IPSec tunnels in the hotspot gateway GPN 110 may be sorted in decreasing order of $\alpha_i$, and the largest K (K is positive integer, 1≤K≤m), which meets the following formula (5), IPSec tunnels may be chosen and migrated in that order.

$$\sum_{i=1}^{m} \alpha_i > \beta_j - T_H \qquad (5)$$

Based on such selection mechanism of IPSec tunnels, it is possible to achieve the loads balance of VMs 111 in the case that the number of migration of IPSec tunnels is less.

If there is no suitable relatively free GPN 110 found, inactive VM 111 may be selected to run new GPN 110, and the IPSec tunnel, which needs to be migrated, may be migrated to the new GPN 110. Therefore, the inactive VM 111 may be switched to active VM 111.

Figure 3:
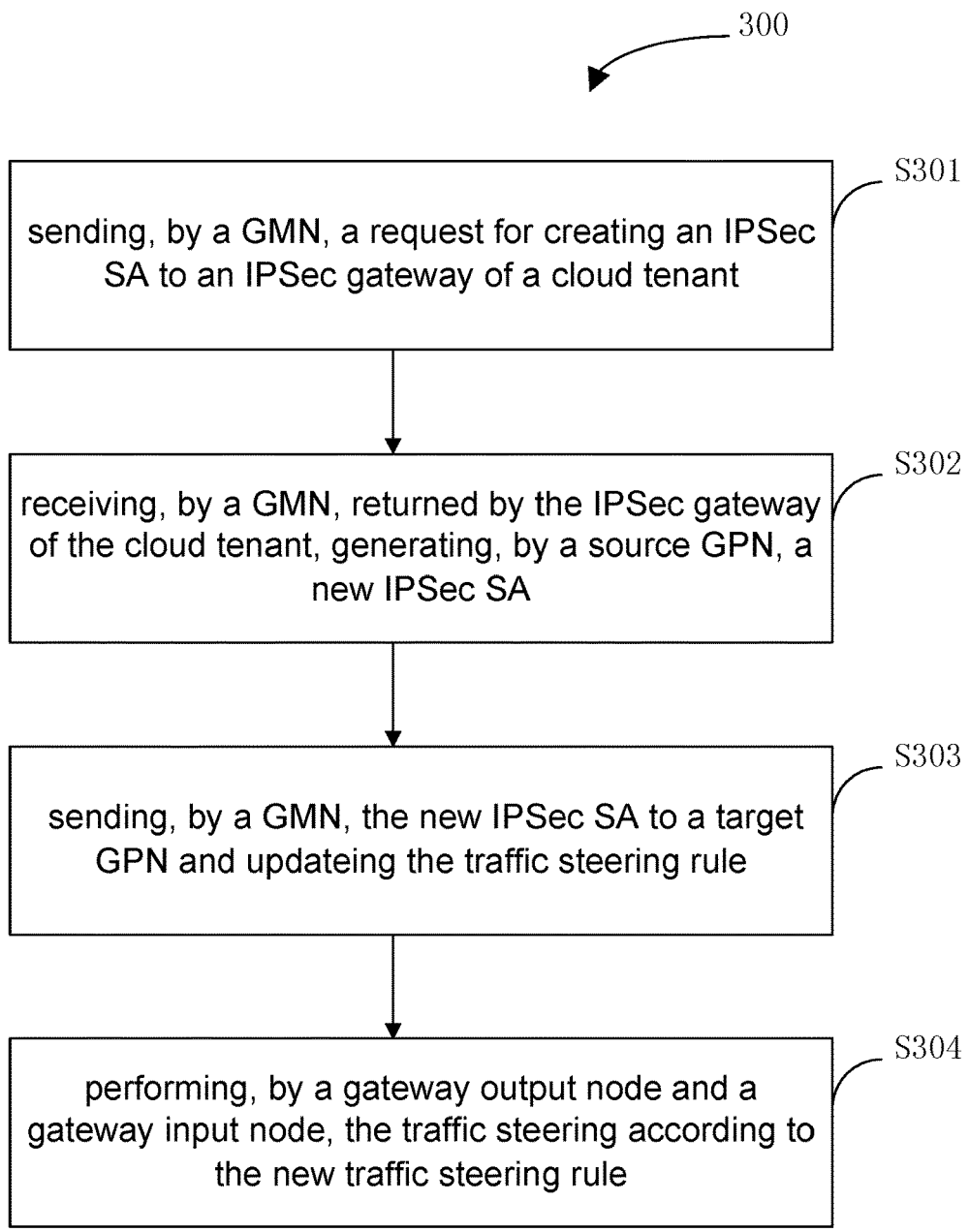
FIG. 3 is a schematic diagram showing migrating of IPSec tunnels of embodiments of the present disclosure.

Migration of IPSec Tunnel:

The migration of IPSec tunnels may include the updating and sending of IPSec SAs, and updating and sending of traffic steering rules. In some examples, the GMN 113 may perform the migration of IPSec tunnels by means of IKE key updating. As shown in FIG. 3, it shows a schematic diagram 300 showing migrating of an IPSec tunnel of an embodiment of the present disclosure. The migrating of IPSec tunnels may include:

S301: a GMN 113 sends a request for creating an IPSec SA to an IPSec gateway 104 of a cloud tenant, the request carries a new DH (Diffie-Hellman, which is a kind of key consensus algorithm) value;

S302: a GMN 113 receives a response for creating an IPSec SA returned by the IPSec gateway 104 of the cloud tenant, the response includes the DH value and a responded Nonce (Number used once, which is any or non-repeated random number, which can be used only once). The GMN 113 sends the DH value and Nonce included in the response to a source GPN (a GPN 110 currently processing the traffic of the migrated IPSec tunnel). The source GPN generates a new IPSec SA according to the DH value and Nonce, and sends it to the GMN 113. The IPSec SA includes a new incoming IPSec SA and a new outgoing IPSec SA.

S303: the GMN 113 sends the new IPSec SA to a target GPN (a GPN 110 receiving the migrated IPSec tunnel). Furthermore, the GMN 113 further generates a new incoming ESP/AH traffic steering rule and/or a new outgoing IP traffic steering rule, and sends the new incoming ESP/AH traffic steering rule to the gateway input node 114 and/or sends the new outgoing IP traffic steering rule to the gateway output node 115.

S304: the gateway output node 115 and the gateway input node 114 perform the traffic steering according to the new traffic steering rule.

More particularly, the gateway output node 115 steers outgoing IP traffic corresponding to the migrated IPSec tunnel to the target GPN according to the new outgoing IP traffic steering rule. The target GPN encrypts the outgoing IP traffic by using the new outgoing IPSec SA, generates outgoing ESP/AH traffic, and transfers it to the IPSec gateway 104 of the cloud tenant.

The gateway input node 114 steers incoming ESP/AH traffic corresponding the migrated IPSec tunnel to the target GPN according to the new incoming ESP/AH traffic steering rule. The target GPN decrypts the incoming ESP/AH traffic by using the new incoming IPSec SA, and sends it to a virtual private cloud network 107 of corresponding cloud tenant.

It should be noted that, during the migrating of the IPSec tunnel, the old IPSec SA is not destroyed and the source GPN performs encrypting and decrypting operations still with the old IPSec SA. Therefore, the seamless migrating of the IPSec tunnel may be achieved without degrading the transfer performance of the IPSec tunnel.

Data plane of distributed IPSec gateway

Still referring to FIG. 1, the data plane 109 of the distributed gateway 106 may include a gateway input node 114, a gateway output node 115 and a plurality of GPNs 110.

Each GPN 110 may be run by one VM 111 in the VM resource pool 112. In the following, description would be made on basic functions and structure of each component of the data plane 109 of distributed IPSec gateway 106.

VM Resource Pool

In some examples, the VMs 111 in the VM resource pool 112 may be configured as being more than GPNs 110, so as to adapt the volatility of the traffic of the IPSec tunnels and the volatility of the number of the IPSec tunnels. As explained above, the VM resource pool 112 may include active VMs 111, inactive VMs 111 and shutdown VMs 111. The active VM 111 is a VM 111 currently using GPN 110 and used for processing traffic of current IPSec tunnels. The inactive VM 111 is a VM 111 in a standby state, which is already booted, but not running GPN 110 yet. The inactive VM 111 may be controlled by the service thread of the distributed IPSec gateway 106, and is the VM 111 which is ready for running GPN 110 anytime. Since the inactive VM 111 is already booted, when the inactive VM 111 is used to run a new GPN 110, it is unnecessary to perform the booting of the VM 111, and thus it may be instantly run the new GPN 110 to perform the traffic processing of the IPSec tunnel. The shutdown VM 111 has not been booted, and not occupied by any service thread, and thus the shutdown VM 111 actually occupies no VM resources of the cloud provider. In the VM resource pool 112, the VM actually occupying the VM resources of the cloud provider is the inactive VMs 111 and active VMs 111. In some examples, the VM resource pool 112 may only include the inactive VMs 111 and active VMs 111, but not include the shutdown VMs 111. When it is necessary to add the inactive VMs 111, a request may be made to the OS (operation system) of a cloud server for VM resource, and the VM 111 which has been initialized to be inactive VM may be added into the VM resource pool 112.

Based on the above way for configuring the VM resource pool 112, the GMN 113 may monitor the running status of each GPN 110, and particularly monitor the incoming ESP/AH traffic and/or outgoing IP traffic of each IPSec tunnel being processed by GPNs 110, and determine whether or not the sum of incoming ESP/AH traffic and/or outgoing IP traffic of all IPSec tunnels being processed by the GPNs 110 is over the loads capability threshold of VM 111 running that GPN 110. If the sum is over the threshold, the tunnel migrating control may be launched. More particularly, the GMN 113 may obtain related data on the running status of each GPN 110 from the GPNs 110. Each GPN 110 may initiatively report the related data on the running status to the GMN 113 so as to achieve the monitoring on running status of each GPN 110 by GMN 113. Description on the loads monitoring of GPN 110 and migrating of IPSec tunnel has been made in the description on the control plane 108, and repeated description would be omitted.

Furthermore, in some examples, the GPN 110 may initiatively monitor incoming ESP/AH traffic and/or outgoing IP traffic of IPSec tunnels being processed by itself, and determine whether or not the sum of incoming ESP/AH traffic and/or outgoing IP traffic of its all IPSec tunnels is over the loads capability threshold of VM 111 where it is located. If the sum is over the threshold, the request for tunnel migrating may be sent to GMN 113 so as to launch the migrating control of IPSec tunnel by GMN 113.

GPN 110

Figure 4:
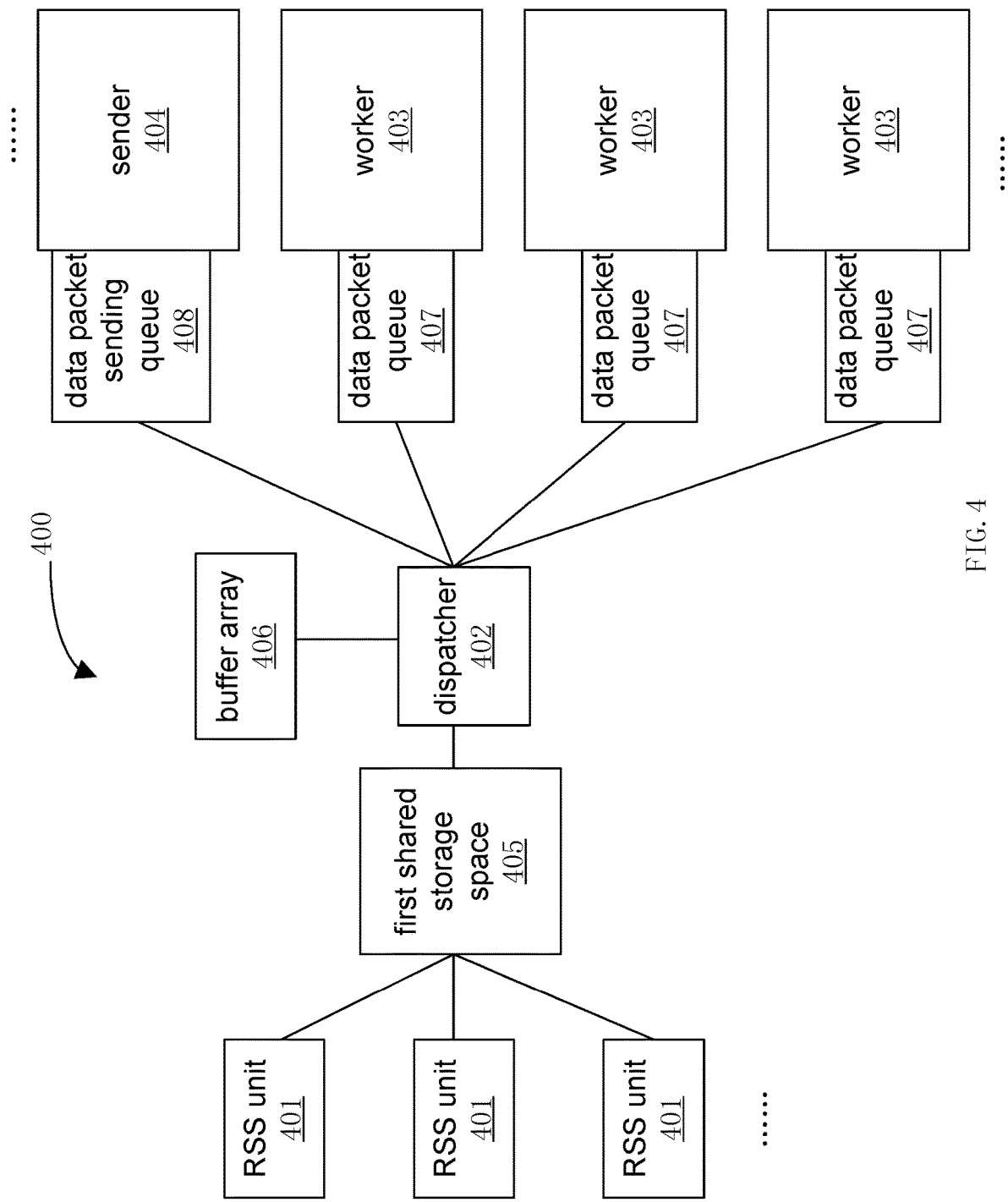
FIG. 4 is a structural diagram showing gateway processing nodes of embodiments of the present disclosure.

As shown in FIG. 4, it shows a structural diagram 400 showing gateway processing nodes 110 of embodiments of the present disclosure. The main processing of GPN 110 may include encryption and encapsulation and/or decryption and decapsulation on packets. More particularly, on one hand, GPN 110 may decrypt and decapsulate the data packets of the incoming ESP/AH traffic of the IPSec tunnel to generate the data packets of the incoming IP traffic, and send the data packets of the incoming IP traffic to the virtual private cloud network 107 of the cloud tenant; on the other hand, GPN 110 may encrypt and encapsulate the data packets of the outgoing IP traffic to generate the data packets of the outgoing ESP/AH traffic, and send the data packets of the outgoing ESP/AH traffic to the local network 102 of the cloud tenant via internet. Each GPN 110 may process the traffic of one or more IPSec tunnels. The specific number of the IPSec tunnels to be processed may depend on the data amount transferred through the IPSec tunnels and the loads capability threshold of VMs 111.

GPN 110 may include one or more RSS (receive side scaling) units 401, dispatcher 402, one or more workers 403, and one or more senders 404.

The gateway input node 114 and the gateway output node 115 may send traffic steering rules to GMN 113, amend destination IP address of the received data packet to the IP address of corresponding GPN 110, and send it to corresponding GPN 110 via a network card. The RSS unit 401 may obtain the data packet sent by the gateway input node 114 and gateway output node 115 from the network card (NIC), and store it in the shared storage space between the user space and kernel of OS of the cloud server. The shared storage space may be a shared storage space allocated to GPN 110 by the OS. To be distinguished from the shared storage space allocated to the gateway input node 114 and gateway output node 115 described in the following, the shared storage space allocated to GPN 110 may be referred as a first shared storage space 405. The working thread of GPN 110 and kernel thread may both access the first shared storage space 405, so as to avoid the redundant copy of the data packet between the working thread of the GPN 110 and the kernel thread. Furthermore, GPN 110 may be further provided with a Filter Driver, which may be provided with circular queues containing pointers pointing to data packets stored in the first shared storage space 405.

The dispatcher may be used to generate data packet processing tasks and send them to all workers 403. The data packet processing tasks may include encrypting and encapsulating on the data packets, decrypting and decapsulating on the data packets. The workers 403 may be used to perform corresponding data packet processing tasks and may be independent from each other so as to work in parallel. The sender 404 may be used to send the data packets processed by the workers 403 to outside of the IPSec gateway.

More particularly, the dispatcher may keep dequeueing packet pointers from the queues exposed by the Filter Driver in a round-robin fashion so as to generate the data packet processing tasks. When processing the data packets of outgoing IP traffic, the dispatcher 402 may determine the ESP/AH sequence number. More particularly, the dispatcher 402 may assign an appropriate ESP/AH sequence number to a data packet based on the 5-tuple of the data packet (source IP address, destination IP address, source port, destination port, protocol type). Since the dispatcher is the only thread manipulates the data packet counters, the uniqueness of the data packet of the IPSec tunnel can be guarantee. The dispatcher 403 may further keep a buffer array 406 used to buffer the encrypted and encapsulated, decrypted and decapsulated data packets to be sent to outside of the distributed IPSec gateway 106.

The dispatcher 402 wraps a packet pointer, sequence number, and index of buffer array 406 using Task Structure to generate data packet processing tasks. More particularly, the index of the buffer array 406 may point to the specific buffer in the buffer array 406 for storing the data packets processed by the worker 403. Since the processing performance of all workers 403 are almost homogeneous, the dispatcher 402 may put the data packet processing tasks to the data packet queue 407 of the worker 403 in a round-robin fashion.

The worker 403 may sequentially process the tasks in its data packet processing tasks queue 407. During the data packet processing, the data packet to be processed may be obtained according to the pointer of the data packets in the data packet processing tasks. After the data packet processing is completed, the processed data packets may be put to the specified position in the buffer array 406 according to the index of the buffer array 406 in the data packet processing tasks.

When the buffer array 406 is filled up (or loaded to a preset proportion) or a timeout occurs, the dispatcher 402 enqueues a data packet sending request to a data packet sending queue 408 of the sender 404. The sender 404 may sequentially process the data packet sending request in its data packet sending queue 408, and send the data packets, which have been processed by the worker 403 and stored in the buffer array 406, to the outside of the IPSec gateway.

In some examples, the dispatcher 402, the worker 403, and the sender 404 may be all in a form of worker threads, and the dispatcher 402, the functions of the worker 403 and the sender 404 may exchange according to cases. For example, when all workers 403 are filled up with the data packet processing tasks, the dispatcher 402 may enqueue the data packet processing tasks into its own task queue, and then may dequeue data packet processing tasks from the queues sequentially and do the tasks. For another example, except the dedicated sender 404, the worker 403 itself may have the function of sender 404. More particularly, the worker 403 may be provided with two task queues of a data packet processing tasks queue 407 and a data packet sending tasks queue 408. Generally, the worker 403 may only process the data packet processing tasks in the data packet processing tasks queue 407, while there is no tasks in the data packet sending tasks queue 408. When the data packet sending tasks queue 408 of the sender 404 is filled up, the sender 402 may send the data packets of the worker 403 to a request for enqueuing data packets into tasks queue 408, so that the worker 403 may be switched to sender 404 to perform the data packets sending tasks.

Gateway Input Node and Gateway Output Node

The gateway input node 114 and the gateway output node 115 may be used to steer the traffic of the IPSec tunnels. The gateway input node 114 may send received data packets of incoming ESP/AH traffic to corresponding GPN 110 according to the incoming ESP/AH traffic steering rules sent by the GMN 113, and the gateway output node 115 may send received data packets of outgoing IP traffic to corresponding GPN 110 according to the outgoing IP traffic steering rules sent by GMN 113.

In some examples, the traffic steering rules sent by GMN 113 may include matching relationship between IPSec tunnels and GPN 110, so as to implement the steering for the data packets of incoming ESP/AH traffic and the data packets of outgoing IP traffic to the specific GPN 110.

The data packets received by the gateway input node 114 and the gateway output node 115 may be stored in the shared storage space between the user space and kernel of OS of the cloud server. The shared storage space is a shared storage space assigned to the gateway input node 114 and gateway output node 115 by the OS. To be distinguished from the shared storage space allocated to the GPN 110, the shared storage space assigned to the gateway input node 114 and gateway output node 115 may be referred to the second shared storage space, which may avoid the redundant copy of the data packets between the working threads of the gateway input node 114 and the gateway output node 115 and kernel threads. Upon receiving data, the gateway input node 114 and the gateway output node 115 may extract data packets from the second shared storage space, and rewrite the destination IP address of the data packets to the IP address of GPN 110 responsible for processing the data packets, and forward the data packets to corresponding GPN 110.

For the incoming ESP/AH traffic, the gateway input node 114 may need to identify different ESP/AH traffic of different IPSec tunnels, so as to assign the data packet of ESP/AH traffic of different IPSec tunnels to corresponding GPN 110 for processing. The steering rules of incoming EP/AH traffic sent to gateway input node 114 by GMN 113 may include matching relationship between SPI and IP address of GPN 110. After receiving the data packets of ESP/AH traffic, the gateway input node 114 may perform search in the steering rules for the incoming ESP/AH traffic according to the SPI carried by the data packets so as to obtain the IP address of GPN 110 corresponding to the SPI, and amend the destination IP address of the data packet of ESP/AH traffic to the IP address of GPN 110, and then send the data packet of the ESP/AH traffic to corresponding GPN 110.

For the outgoing IP traffic, the gateway output node 115 may determine to which GPN 110 the outgoing IP traffic should be steered for processing according to the network information (5-tuple of a packet) of the traffic selector carried in the data packet of outgoing IP traffic. The steering rules of outgoing IP traffic sent to gateway output node 115 by GMN 113 may include matching relationship between traffic selector and IP address of GPN 110. After receiving the data packets of outgoing IP traffic, the gateway output node 115 may perform search in the steering rules for the outgoing IP traffic according to the traffic selector carried by the data packets so as to obtain the IP address of GPN 110 corresponding to the traffic selector, and amend the destination IP address of the data packet of outgoing IP traffic to the IP address of GPN 110, and then send the data packet of the outgoing IP traffic to corresponding GPN 110.

Examples of Implementation

Figure 5:
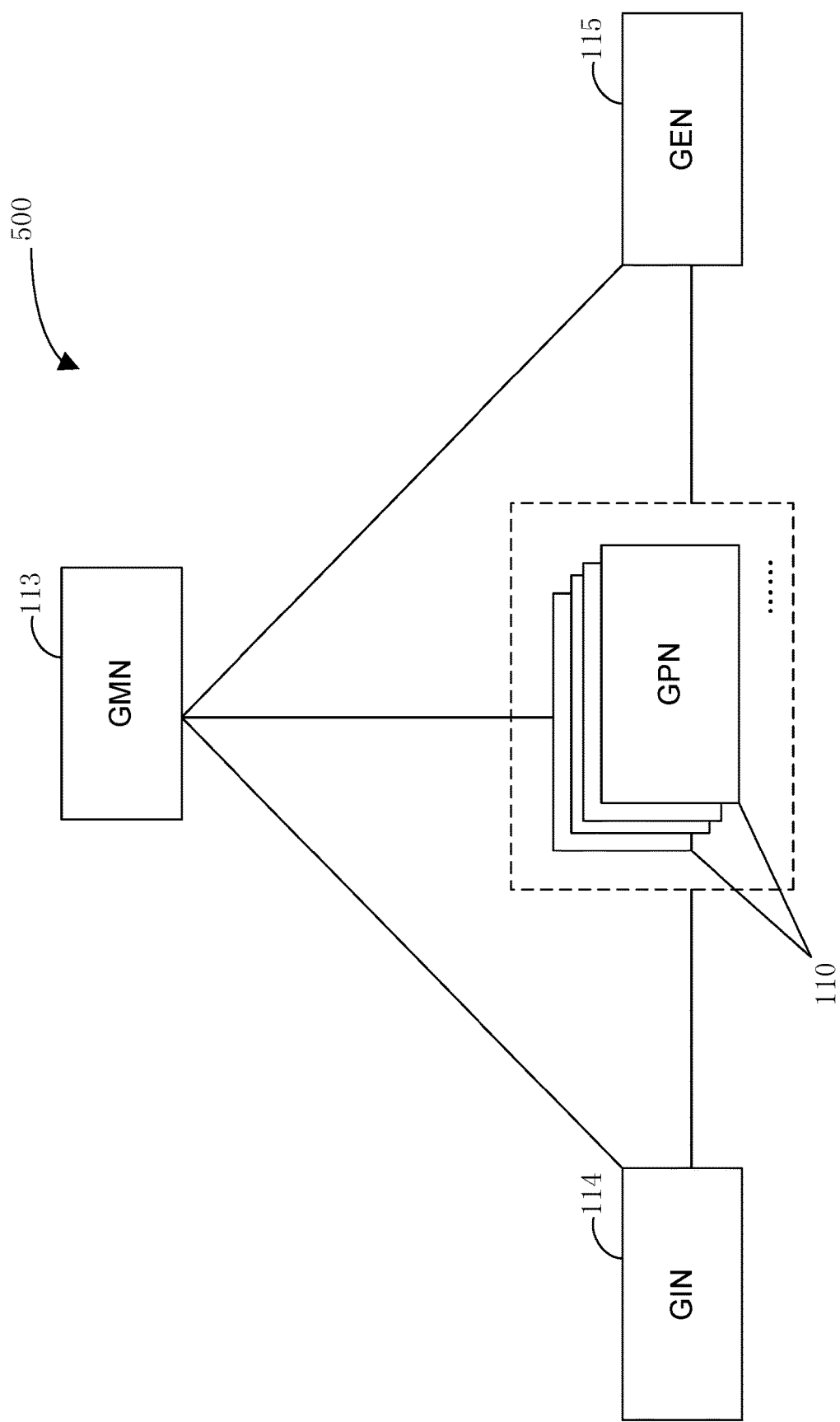
FIG. 5 is a systemic structural diagram showing an distributed IPSec gateway of embodiments of the present disclosure.

As shown in FIG. 5, it shows a systemic structural diagram 500 showing a distributed IPSec gateway of an embodiment of the present disclosure. In the diagram 500, a GMN 113 and a plurality of GPNs 110 are included.

The GMN 113 may be configured to generate IPsec SAs of a plurality of IPSec tunnels, and send them to the GPN 110 for processing data packets of incoming ESP/AH traffic and/or data packets of outgoing IP traffic of corresponding IPSec tunnel, and steer the incoming ESP/AH traffic and/or outgoing IP traffic between the plurality of GPNs 110.

Each GPN 110 may be configured to: process received data packets of incoming ESP/AH traffic by using the IPSec SAs sent by GMN 113 to generate data packets of incoming IP traffic, and/or/process received data packets of outgoing IP traffic to generate data packets of outgoing ESP/AH traffic.

Furthermore, the diagram 500 may further include gateway input node 114 and/or gate output node 115.

In GMN 113, the steering on the incoming ESP/AH traffic and/or outgoing IP traffic between the plurality of GPNs 110 may include: generating incoming ESP/AH traffic steering rules for steering the incoming ESP/AH traffic between the plurality of GPNs 110, and sending the incoming ESP/AH traffic steering rules to the gateway input node 114, and/or generating outgoing IP traffic steering rules for steering outgoing IP traffic between the plurality of GPNs 110, and sending the outgoing IP traffic rules to the gateway output node 115.

The gateway input node 114 may be configured to receive data packets of incoming ESP/AH traffic and send the received data packets of incoming ESP/AH traffic to corresponding GPN 110.

The gateway output node 115 may be configured to receive data packets of outgoing IP traffic and send the received data packets of outgoing IP traffic to corresponding GPN 110.

In some examples, the specific structure of the above GPN 110 may be the structure as shown in FIG. 4. Furthermore, detailed description has been made on the specific implementation on each part of the diagram 500, and may be applied to each part in diagram 500. In some examples, the system structure as shown in FIG. 5 may be implemented in a way of distributed architecture with a plurality of servers. For example, GMN 113, GPN 110, gateway input node 114 and gateway output node 115 may be implemented with independent servers, respectively, and network communication may be established among the servers so as to implement the functions of the distributed gateway of embodiments of the present disclosure.

Furthermore, in some examples, each component or module related in the above FIG. 1, FIG. 2, FIG. 4, and FIG. 5, such as, GMN 113, GPN 110, gateway input node 114 and gateway output node 115 and the like, and one or more steps in the flow chart shown in FIG. 3 may be implemented by software, hardware, or in combination of software and hardware. For example, the above component or module and one or more steps may be implemented in system on chip (SoC). Soc may include: integrated circuit chip, including one or more of processing unit (such as center processing unit (CPU), micro controller, micro processing unit, digital signal processing unit (DSP) or the like), memory, one or more communication interface, and/or other circuit for performing its function and alternative embedded firmware.

Figure 6:
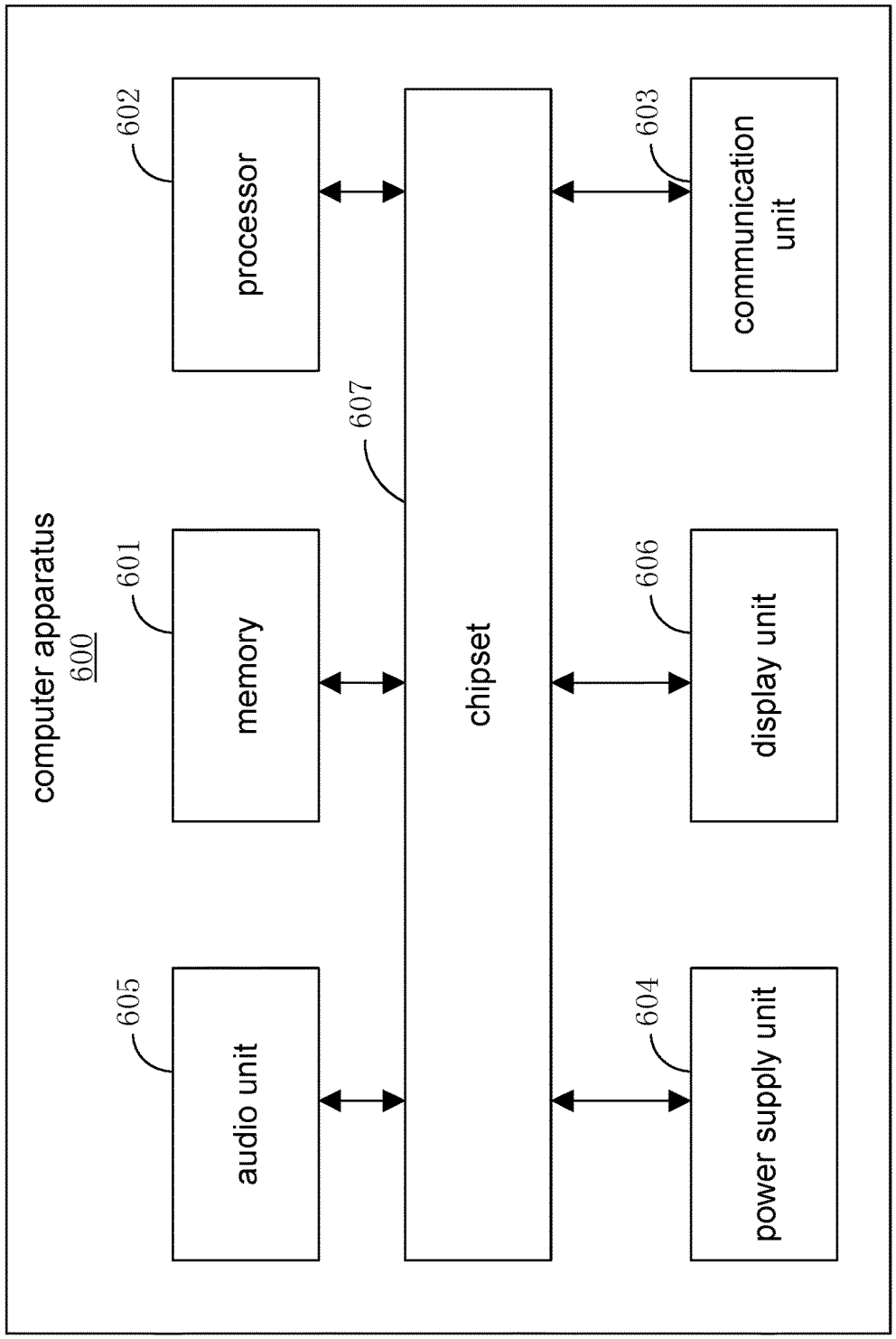
FIG. 6 is a computer apparatus of embodiments of the present disclosure.

As shown in FIG. 6, which is a computer apparatus 600 of an embodiment of the present disclosure, the computer apparatus 600 may include: a memory 601 and a processor 602.

The memory 601 may be configured to store programs. In addition to the above programs, the memory 601 may be configured to store other data to support operations on the computer apparatus 600. The examples of these data may include instructions of any applications or methods operated on the computer apparatus 600, contact data, phone book data, messages, pictures, videos, and the like.

The memory 601 may be implemented by any kind of volatile or nonvolatile storage device or their combinations, such as static random access memory (SRAM), electronically erasable programmable read-only memory (EEPROM), erasable programmable read-only memory (EPROM), programmable read-only memory (PROM), read-only memory (ROM), magnetic memory, flash memory, disk memory, or optical disk.

The memory 601 may be coupled to the processor 602 and contain instructions stored thereon. The instructions may cause the computer apparatus to perform operations upon being executed by the processor 602, the operations may include: configuring GMN 113 to generate IPsec SAs of a plurality of IPSec tunnels, and send them to the GPN 110 for processing data packets of incoming ESP/AH traffic and/or data packets of outgoing IP traffic of corresponding IPSec tunnel, and steer the incoming ESP/AH traffic and/or outgoing IP traffic between the plurality of GPNs 110; and configure a plurality of GPNs 110 to: process received data packets of incoming ESP/AH traffic by using the IPSec SA sent by GMN 113 to generate data packets of incoming IP traffic, and/or process received data packets of outgoing IP traffic to generate data packets of outgoing ESP/AH traffic.

In some examples, the above operations may further include: configuring gateway input node 114 and/or gateway output node 115, and in GMN 113, the steering s the incoming ESP/AH traffic and/or outgoing IP traffic between the plurality of GPNs 110 may include: generating incoming ESP/AH traffic steering rules for steering the incoming ESP/AH traffic between the plurality of GPNs 110, and sending the incoming ESP/AH traffic steering rules to the gateway input node 114, and/or generating outgoing IP traffic steering rules for steering outgoing IP traffic between the plurality of GPNs 110, and sending the outgoing IP traffic rules to the gateway output node 115.

The gateway input node 114 may be configured to receive data packets of incoming ESP/AH traffic and send the received data packets of incoming ESP/AH traffic to corresponding GPN 110.

The gateway output node 115 may be configured to receive data packets of outgoing IP traffic and send the received data packets of outgoing IP traffic to corresponding GPN 110.

In some examples, GMN 113 may be further configured to maintain a VM resource pool 112 for running GPNs 110 and allocate the VM resource of VM resource pool 112. More particularly, each GPN 110 may be run by one VM 111 in VM resource pool 112.

In some examples, the VM resource pool 112 may include VMs 111 in the following states: active VMs, which are booted and being used for running GPN 110; inactive VMs, which are booted and ready for running GPN 110.

Adjusting on the allocating of the VM resources of the VM resource pool 112 may include: upon a new IPSec tunnel is being established or it is necessary to perform migrating of IPSec tunnels, if the GMN 113 fails to find a VM 111 having loads redundancy, the GMN 113 may select VM 111 from inactive VMs 111 to run a new GPN 110 to process the traffic of new IPSec tunnel or the traffic of the migrated IPSec tunnel.

In some examples, the adjusting on the allocating of the VM resources of the VM resource pool 112 may include: adjust the allocating of the VM resources of the VM resource pool 112 based on the performance requirements promised to the cloud tenant by the cloud provider corresponding to established IPSec tunnels and loads capability of VMs 111, so that the resource allocation in the VM resource pool 112 may satisfy the sum of performance requirements of established IPSec tunnels.

In some examples, GMN 113 may be further configured to control the migration of the IPSec tunnels from source GPNs 110 to target GPNs 110, the control on the migration of the IPSec tunnels may include:

GMN 113 may generate a new IPSec SA of migrated tunnel, and send the new IPSec SA to the target GPN 110; generate a new steering rule of incoming ESP/AH traffic and/or a new steering rule of outgoing IP traffic, and send the new steering rule of incoming ESP/AH traffic to the gateway input node 114 and/or send the new steering rule of outgoing IP traffic to the gateway output node 115.

More particularly, during the migration of the IPSec tunnels, the source GPN 110 may use the old IPSec SA to process the data packets of incoming ESP/AH traffic and/or data packets of outgoing IP traffic of the migrated tunnels.

More particularly, the above migration control on the IPSec tunnels may be performed during the updating of the IKE keys.

In some examples, GMN 113 may be further configured to monitor the incoming ESP/AH traffic and/or outgoing IP traffic of IPSec tunnels processed by GPNs 110, and determine whether or not the sum of the incoming ESP/AH traffic and/or outgoing IP traffic of all IPSec tunnels processed by the GPNs 110 is over the loads capability threshold of VM 111 running the GPN 110.

If the sum of incoming ESP/AH traffic and/or outgoing IP traffic is over the processing loads threshold of VM 111 running that GPN 110, the control of tunnel migration may be performed.

In some examples, GMN 113 may be further configured to calculate the difference between loads capability thresholds of VM 111 and incoming ESP/AH traffic and/or outgoing IP traffic of IPSec tunnels processed by GPNs 110, and sort the plurality of IPSec tunnels processed by GPNs 110 based on that difference, and select the IPSec tunnel which needs to be migrated in a descending order based on that difference, till the sum of incoming ESP/AH traffic and/or outgoing IP traffic of all IPSec tunnels processed by that GPN 110 is less than the loads capability threshold.

Detailed description has been made on the above operations in the above embodiments, and the description on the above operations may be applied to computer apparatus 600. That is to say, the specific operations mentioned in the above embodiments may be recorded in memory 601 in program and be performed by processor 602.

Furthermore, as shown in FIG. 6, the computer apparatus 600 may further include: a communication unit 603, a power supply unit 604, an audio unit 605, a display unit 606, chipset 607, and other units. Only part units are exemplarily shown in FIG. 6 and it is obvious to one skilled in the art that the computer apparatus 600 only includes the units shown in FIG. 6.

The communication unit 603 may be configured to facilitate wireless or wired communication between the computer apparatus 600 and other apparatuses. The computer apparatus may be connected to wireless network based on communication standard, such as WiFi, 2G, 3G, or their combination. In an exemplary example, the communication unit 603 may receive radio signal or radio related information from external radio management system via radio channel. In an exemplary example, the communication unit 603 may further include near field communication (NFC) module for facilitating short-range communication. For example, the NFC module may be implemented with radio frequency identification (RFID) technology, Infrared data association (IrDA) technology, ultra wideband (UWB) technology, Bluetooth (BT) technology and other technologies.

The power supply unit 604 may be configured to supply power to various units of the computer apparatus. The power supply unit 604 may include a power supply management system, one or more power supplies, and other units related to power generation, management, and allocation.

The audio unit 605 may be configured to output and/or input audio signals. For example, the audio unit 605 may include a microphone (MIC). When the computer apparatus in an operation mode, such as calling mode, recording mode, and voice recognition mode, the MIC may be configured to receive external audio signals. The received audio signals may be further stored in the memory 601 or sent via the communication unit 603. In some examples, the audio unit 605 may further include a speaker configured to output audio signals.

The display unit 606 may include a screen, which may include liquid crystal display (LCD) and touch panel (TP). If the screen includes a touch panel, the screen may be implemented as touch screen so as to receive input signal from users. The touch panel may include a plurality of touch sensors to sense touching, sliding, and gestures on the touch panel. The touch sensor may not only sense edges of touching or sliding actions, but also sense period and pressure related to the touching or sliding operations.

The above memory 601, processor 602, communication unit 603, power supply unit 604, audio unit 605 and display unit 606 may be connected with the chipset 607. The chipset 607 may provide interface between the processor 602 and other units of the computer apparatus 600. Furthermore, the chipset 607 may provide interface for each unit of the computer apparatus 600 to access the memory 601 and communication interface for accessing among units.

EXAMPLES

Figure 7:
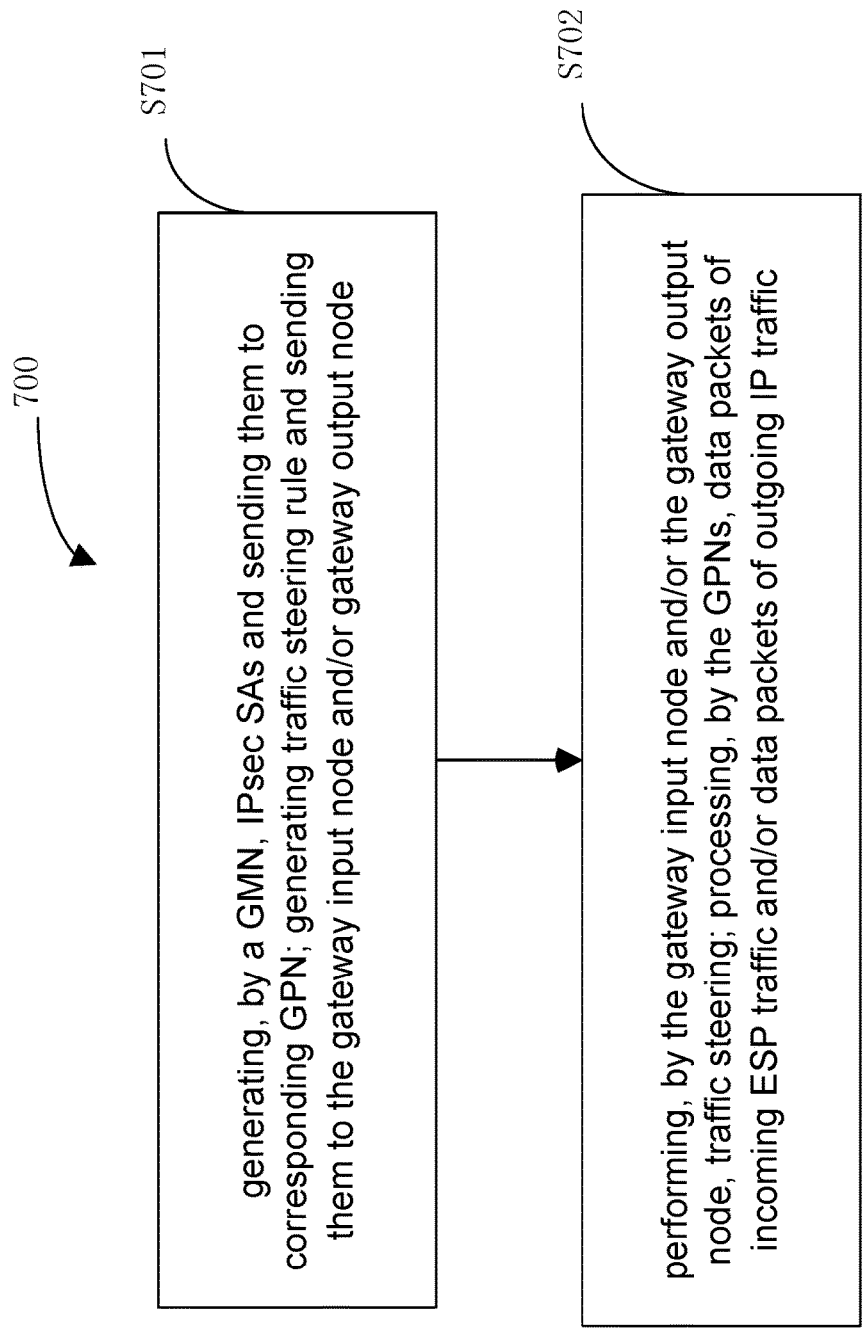
FIG. 7 is a flowchart showing processing of the distributed IPSec gateway of embodiments of the present disclosure.

As shown in FIG. 7, it shows a flowchart 700 showing processing of the distributed IPSec gateway of embodiments of the present disclosure. The operations shown in FIG. 7 may be based on the IPSec gateway including GMN 113, a plurality of GPNs 110, and may include:

S701: GMN 113 may generate IPsec SAs of a plurality of IPSec tunnels, and send them to the GPN 110 for processing data packets of incoming ESP/AH traffic and/or data packets of outgoing IP traffic of corresponding IPSec tunnel, and steer the incoming ESP/AH traffic and/or outgoing IP traffic between the plurality of GPNs 110. More particularly, in some examples, the steering on incoming ESP/AH traffic and/or outgoing IP traffic may be performed in a way of traffic steering rule.

In some examples, the IPSec gateway may further include gateway input node 114 and/or gateway output node 115. GMN 113 may generate incoming ESP/AH traffic steering rules for steering the incoming ESP/AH traffic between the plurality of GPNs 110, and send the incoming ESP/AH traffic steering rules to the gateway input node 114, and/or generate outgoing IP traffic steering rules for steering outgoing IP traffic between the plurality of GPNs 110, and send the outgoing IP traffic rules to the gateway output node 115. The gateway input node 114 and/or gateway output node 115 may perform the steering on incoming ESP/AH traffic and/or outgoing IP traffic according to corresponding traffic steering rules.

S702: GPNs 110 may process received data packets of incoming ESP/AH traffic by using the IPSec SAs sent by GMN 113 to generate data packets of incoming IP traffic, and/or process received data packets of outgoing IP traffic to generate data packets of outgoing IP traffic.

In some examples, GMN 113 maintains a VM resource pool 112 for running GPNs 110 and allocates the VM resource of VM resource pool 112. More particularly, each GPN 110 may be run by one VM 111 in VM resource pool 112.

In some examples, the VM resource pool 112 may include VMs 111 in the following states: active VMs, which are booted and being used for running GPN 110; inactive VMs, which are booted and ready for running GPN 110.

Adjusting on the allocating of the VM resources of the VM resource pool 112 may include: upon a new IPSec tunnel is being established or it is necessary to perform migrating of IPSec tunnel, if the GMN 113 fails to find a VM 111 having loads redundancy, the GMN 113 may select VM 111 from inactive VMs 111 to run a new GPN 110 to process the traffic of new IPSec tunnel or the traffic of the migrated IPSec tunnel.

In some examples, the adjusting on the allocating of the VM resources of the VM resource pool 112 may include: adjust the allocating of the VM resources of the VM resource pool 112 based on the performance requirements promised to the cloud tenant by the cloud provider corresponding to established IPSec tunnels and loads capability of VMs 111, so that the resource allocation in the VM resource pool 112 may satisfy the sum of performance requirements of established IPSec tunnels.

In some examples, GMN 113 may be further configured to control the migration of the IPSec tunnels from source GPNs 110 to target GPNs 110, the control on the migration of the IPSec tunnels may include:

GMN 113 may generate a new IPSec SA of migrated tunnel, and send the new IPSec SA to the target GPN 110; generate a new steering rule of incoming ESP/AH traffic and/or a new steering rule of outgoing IP traffic, and send the new steering rule of incoming ESP/AH traffic to the gateway input node 114 and/or send the new steering rule of outgoing IP traffic to the gateway output node 115.

More particularly, during the migration of the IPSec tunnels, the source GPN 110 may use the old IPSec SA to process the data packets of incoming ESP/AH traffic and/or data packets of outgoing IP traffic of the migrated tunnels.

More particularly, the above migration control on the IPSec tunnels may be performed during the updating of the IKE keys.

In some examples, GMN 113 may be further configured to monitor the incoming ESP/AH traffic and/or outgoing IP traffic of IPSec tunnels processed by GPNs 110, and determine whether or not the sum of the incoming ESP/AH traffic and/or outgoing IP traffic of all IPSec tunnels processed by the GPNs 110 is over the loads capability threshold of VM 111 running the GPN 110.

If the sum of incoming ESP/AH traffic and/or outgoing IP traffic is over the processing loads threshold of VM 111 running that GPN 110, the control of tunnel migration may be performed.

In some examples, GMN 113 may be further configured to calculate the difference between loads capability thresholds of VM 111 and incoming ESP/AH traffic and/or outgoing IP traffic of each IPSec tunnel processed by GPN 110, and sort the plurality of IPSec tunnels processed by GPN 110 based on that difference, and select the IPSec tunnel which needs to be migrated in a descending order based on that difference, till the sum of incoming ESP/AH traffic and/or outgoing IP traffic of all IPSec tunnels processed by that GPN 110 is less than the loads capability threshold.

Detailed description on the specific technical contents of procedures related to the above methods has been made in the above embodiments and may be referred to the above description.

Example Clauses

A. A computer apparatus, including: a processing unit; and a memory, coupled to the processing unit and containing instructions stored thereon, the instructions cause the computer apparatus to perform operations upon being executed by the processing unit, the operations may include: configuring a gateway management node to: generate IPsec SAs of a plurality of IPSec tunnels, and send them to gateway processing nodes for processing data packets of incoming ESP/AH traffic and/or data packets of outgoing IP traffic of corresponding IPSec tunnel, and steer the incoming ESP/AH traffic and/or outgoing IP traffic between a plurality of gateway processing nodes; and configuring the plurality of gateway processing nodes to: process received data packets of incoming ESP/AH traffic by using the IPSec SAs sent by the gateway management node and generate data packets of incoming IP traffic, and/or process received data packets of outgoing IP traffic and generate data packets of outgoing ESP/AH traffic.

B. The computer apparatus according to paragraph A, wherein the operations may further include configuring a gateway input node and/or a gateway output node, the gateway management node is further configured to generate incoming ESP/AH traffic steering rules for steering the incoming ESP/AH traffic between the plurality of gateway processing nodes, and send the incoming ESP/AH traffic steering rules to the gateway input node, and/or generate outgoing IP traffic steering rules for steering outgoing IP traffic between the plurality of gateway processing nodes, and send the outgoing IP traffic rules to the gateway output node; configuring the gateway input node to receive data packets of incoming ESP/AH traffic and send received data packets of incoming ESP/AH traffic to corresponding gateway processing node according to the incoming ESP/AH traffic steering rules; and configuring the gateway output node to receive data packets of outgoing IP traffic and send received data packets of outgoing IP traffic to corresponding gateway processing node according to the outgoing IP traffic steering rules.

C. The computer apparatus according to paragraph A, wherein the gateway management node is further configured to maintain a virtual machine resource pool for running the gateway processing nodes, and adjust allocation of virtual machine resources of the virtual machine resource pool, wherein each gateway processing node is run by one virtual machine in the virtual machine resource pool.

D. The computer apparatus according to paragraph C, wherein the virtual machine resource pool may include virtual machines in the following states: active virtual machines, which are booted and used for currently running gateway processing nodes; inactive virtual machines, which are booted and ready for running gateway processing nodes, the adjusting allocation of virtual machine resources of the virtual machine resource pool may include: upon a new IPSec tunnel is being established or it is necessary to perform migrating of IPSec tunnel, if a gateway management node fails to find a virtual machine having loads redundancy, the gateway management node selects a virtual machine from the inactive virtual machines to run a new gateway processing node to process traffic of the new IPSec tunnel or traffic of the migrated IPSec tunnel.

E. The computer apparatus according to paragraph C or D, wherein the adjusting allocation of virtual machine resources of the virtual machine resource pool may include: adjusting allocation of virtual machine resources of the virtual machine resource pool based on performance requirements promised to a cloud tenant by a cloud provider corresponding to the established IPSec tunnels and loads capability of virtual machines, so that the allocated resources in the virtual machine resource pool satisfy the sum of performance requirements of the established IPSec tunnels.

F. The computer apparatus according to paragraph B, wherein the gateway management node is further configured to control migration of the IPSec tunnels from a source gateway processing node to a target gateway processing node, the controlling migration of the IPSec tunnels may include: by the gateway management node, generating a new IPSec SA of a migrated tunnel, and sending the new IPSec SA to a target gateway processing node; generating a new steering rule of incoming ESP/AH traffic and/or a new steering rule of outgoing IP traffic, and sending the new steering rule of incoming ESP/AH traffic to the gateway input node and/or sending the new steering rule of outgoing IP traffic to the gateway output node, wherein during migration of the IPSec tunnels, a source gateway processing node uses an old IPSec SA to process data packets of incoming ESP/AH traffic and/or data packets of outgoing IP traffic of the migrated tunnels.

G. The computer apparatus according to paragraph F, wherein the controlling migration of the IPSec tunnels is performed during updating of IKE keys.

H. The computer apparatus according to paragraph A, wherein the gateway management node is further configured to monitor incoming ESP/AH traffic and/or outgoing IP traffic of IPSec tunnels processed by gateway processing nodes, and determine whether or not the sum of incoming ESP/AH traffic and/or outgoing IP traffic of all IPSec tunnels processed by the gateway processing node is over loads capability threshold of a virtual machine running the gateway processing node, if the sum of incoming ESP/AH traffic and/or outgoing IP traffic is over the loads capability threshold of the virtual machine running the gateway processing node, the controlling migration is performed.

I. The computer apparatus according to paragraph H, wherein the gateway management node is further configured to calculate a difference between loads capability threshold of virtual machines and incoming ESP/AH traffic and/or outgoing IP traffic of IPSec tunnels processed by gateway processing nodes, and sort a plurality of IPSec tunnels processed by gateway processing nodes based on the difference, and select IPSec tunnels which need to be migrated in a descending order based on the difference, till the sum of incoming ESP/AH traffic and/or outgoing IP traffic of all IPSec tunnels processed by the gateway processing nodes is less than the loads capability threshold.

J. A method applied in an IPSec gateway, the IPSec gateway may include a gateway management node and a plurality of gateway processing nodes, the method may include: generating, by a gateway management node, IPsec SAs of a plurality of IPSec tunnels, and send them to a gateway processing node for processing data packets of incoming ESP/AH traffic and/or data packets of outgoing IP traffic of corresponding IPSec tunnel, and steering the incoming ESP/AH traffic and/or outgoing IP traffic between a plurality of gateway processing nodes; and processing, by gateway processing nodes, received data packets of incoming ESP/AH traffic by using the IPSec SA sent by the gateway management node and generating data packets of incoming IP traffic, and/or processing received data packets of outgoing IP traffic and generating data packets of outgoing ESP/AH traffic.

K. The method according to paragraph J, wherein the IPSec gateway may further include a gateway input node and/or a gateway output node, the method further includes the steering, by the gateway management node, the incoming ESP/AH traffic and/or outgoing IP traffic between a plurality of gateway processing nodes comprises: generating incoming ESP/AH traffic steering rules for steering the incoming ESP/AH traffic between the plurality of gateway processing nodes, and sending the incoming ESP/AH traffic steering rules to the gateway input node, and/or generating outgoing IP traffic steering rules for steering outgoing IP traffic between the plurality of gateway processing nodes, and sending the outgoing IP traffic rules to the gateway output node; receiving, by the gateway input node, data packets of incoming ESP/AH traffic and sending received data packets of incoming ESP/AH traffic to corresponding gateway processing node according to the incoming ESP/AH traffic steering rules; and receiving, by the gateway output node, data packets of outgoing IP traffic and sending received data packets of outgoing IP traffic to corresponding gateway processing node according to the outgoing IP traffic steering rules.

L. The method according to paragraph J, further includes: maintaining, by the gateway management node, a virtual machine resource pool for running the gateway processing node, and adjusting allocation of virtual machine resources of the virtual machine resource pool, wherein each gateway processing node is run by one virtual machine in the virtual machine resource pool.

M. The method according to paragraph L, wherein the virtual machine resource pool may include virtual machines in the following states: active virtual machines, which are booted and used for currently running gateway processing nodes; inactive virtual machines, which are booted and ready for running gateway processing nodes, the adjusting allocation of virtual machine resources of the virtual machine resource pool may include: upon a new IPSec tunnel is being established or it is necessary to perform migrating of IPSec tunnel, if a gateway management node fails to find a virtual machine having loads redundancy, the gateway management node selects a virtual machine from the inactive virtual machines to run a new gateway processing node to process traffic of the new IPSec tunnel or traffic of the migrated IPSec tunnel.

N. The method according to paragraph L or M, wherein the adjusting allocation of virtual machine resources of the virtual machine resource pool may include: adjusting allocation of virtual machine resources of the virtual machine resource pool based on performance requirements promised to a cloud tenant by a cloud provider corresponding to the established IPSec tunnels and loads capability of virtual machines, so that the allocated resources in the virtual machine resource pool satisfy the sum of performance requirements of the established IPSec tunnels.

O. The method according to paragraph K, wherein the gateway management node is further configured to control migration of the IPSec tunnels from a source gateway processing node to a target gateway processing node, the controlling migration of the IPSec tunnels may include: by the gateway management node, generating a new IPSec SA of a migrated tunnel, and sending the new IPSec SA to a target gateway processing node; generating a new steering rule of incoming ESP/AH traffic and/or a new steering rule of outgoing IP traffic, and sending the new steering rule of incoming ESP/AH traffic to the gateway input node and/or sending the new steering rule of outgoing IP traffic to the gateway output node, wherein during migration of the IPSec tunnels, a source gateway processing node uses an old IPSec SA to process data packets of incoming ESP/AH traffic and/or data packets of outgoing IP traffic of the migrated tunnels.

P. The method according to paragraph O, wherein the controlling migration of the IPSec tunnels is performed during updating of IKE keys.

Q. The method according to paragraph J, wherein the gateway management node is further configured to monitor incoming ESP/AH traffic and/or outgoing IP traffic of IPSec tunnels processed by gateway processing nodes, and determine whether or not the sum of incoming ESP/AH traffic and/or outgoing IP traffic of all IPSec tunnels processed by the gateway processing node is over loads capability threshold of a virtual machine running the gateway processing node, if the sum of incoming ESP/AH traffic and/or outgoing IP traffic is over the loads capability threshold of the virtual machine running the gateway processing node, the controlling migration is performed.

R. The method according to paragraph Q, wherein the gateway management node is further configured to calculate a difference between loads capability threshold of virtual machines and incoming ESP/AH traffic and/or outgoing IP traffic of IPSec tunnels processed by gateway processing nodes, and sort a plurality of IPSec tunnels processed by gateway processing nodes based on the difference, and select IPSec tunnels which need to be migrated in a descending order based on the difference, till the sum of incoming ESP/AH traffic and/or outgoing IP traffic of all IPSec tunnels processed by the gateway processing nodes is less than the loads capability threshold.

S. A system, including a gateway management node and a plurality of gateway processing nodes, the gateway management node is runnable to generate IPsec SAs of a plurality of IPSec tunnels, and send them to gateway processing nodes for processing data packets of incoming ESP/AH traffic and/or data packets of outgoing IP traffic of corresponding IPSec tunnel, and steer the incoming ESP/AH traffic and/or outgoing IP traffic between a plurality of gateway processing nodes; and the gateway processing nodes are runnable to: process received data packets of incoming ESP/AH traffic by using the IPSec SAs sent by the gateway management node and generate data packets of incoming IP traffic, and/or process received data packets of outgoing IP traffic and generate data packets of outgoing ESP/AH traffic.

T. The system according to paragraph S, wherein the system may further include a gateway input node and/or a gateway output node, in the gateway management node, the steering the incoming ESP/AH traffic and/or outgoing IP traffic between a plurality of gateway processing nodes may include: generating incoming ESP/AH traffic steering rules for steering the incoming ESP/AH traffic between the plurality of gateway processing nodes, and sending the incoming ESP/AH traffic steering rules to the gateway input node, and/or generating outgoing IP traffic steering rules for steering outgoing IP traffic between the plurality of gateway processing nodes, and sending the outgoing IP traffic rules to the gateway output node; the gateway input node is runnable to receive data packets of incoming ESP/AH traffic and sending received data packets of incoming ESP/AH traffic to corresponding gateway processing node according to the incoming ESP/AH traffic steering rules; and the gateway output node is runnable to data packets of outgoing IP traffic and sending received data packets of outgoing IP traffic to corresponding gateway processing node according to the outgoing IP traffic steering rules.

It would be obvious to one skilled in the art that, all or part of steps for implementing the above embodiments may be accomplished by hardware related to programs or instructions. The above program may be stored in a computer readable storing medium. Such program may perform the steps of the above embodiments upon being executed. The above storing medium may include: ROM, RAM, magnetic disk, or optic disk or other medium capable of storing program codes.

It should be noted that the foregoing embodiments are merely used to illustrate the technical solution of the present disclosure, and not to limit the present disclosure. Although the present disclosure has been described in detail with reference to the foregoing embodiments, one skilled in the art would understand that the technical solutions recited in the foregoing embodiments may be modified or all or a part of the technical features may be replaced equally. These modifications and replacements are not intended to make corresponding technical solution depart from the scope of the technical solution of embodiments of the present disclosure.

The invention claimed is:

1. A computer apparatus, comprising:
a processing unit; and
a memory, coupled to the processing unit and containing instructions stored thereon that, when executed by the processing unit, cause the processing unit to perform operations to:
generate, by a gateway management node in a control plane of an internet protocol security (IPSec) gateway, IPsec security associations (SAs) of a plurality of IPSec tunnels, and send them to gateway processing nodes in a data plane of the IPSec gateway for processing data packets of incoming encapsulating security payload (ESP)/authentication header (AH) traffic and/or data packets of outgoing internet protocol (IP) traffic of corresponding IPSec tunnels, and steer the incoming ESP/AH traffic and/or outgoing IP traffic between a plurality of gateway processing nodes;
process, via the plurality of gateway processing nodes, received data packets of incoming ESP/AH traffic by using the IPSec SAs sent by the gateway management node and generate data packets of incoming IP traffic, and/or process received data packets of outgoing IP traffic and generate data packets of outgoing ESP/AH traffic;
identify an IPSec tunnel to be migrated from a source gateway processing node of the plurality of gateway processing nodes to a target gateway processing node of the plurality of gateway processing nodes;
cause the source gateway processing node to generate a new IPSec SA
transmit the new IPSec SA to the target gateway processing node; and
migrate the IPSec tunnel from the source gateway processing node to the target gateway processing node, wherein an existing connection to the source gateway processing node uses an IPSec SA of the IPSec SAs for the IPSec tunnel for incoming or outgoing traffic with the source gateway processing node; and wherein subsequent incoming or outgoing traffic is processed for the IPSec tunnel using the new IPSec SA and the target gateway processing node.

2. The computer apparatus according to claim 1, wherein the memory further comprising instructions that, when executed by the processing unit, cause the processing unit to perform operations to:
generate incoming ESP/AH traffic steering rules for steering the incoming ESP/AH traffic between the plurality of gateway processing nodes, and send the incoming ESP/AH traffic steering rules to a gateway input node, and/or generate outgoing IP traffic steering rules for steering outgoing IP traffic between the plurality of gateway processing nodes, and send the outgoing IP traffic rules to a gateway output node;
wherein the gateway input node receives packets of incoming ESP/AH traffic and sends received data packets of incoming ESP/AH traffic to a corresponding gateway processing node according to the incoming ESP/AH traffic steering rules; and
wherein the gateway output node receives data packets of outgoing IP traffic and sends received data packets of outgoing IP traffic to a corresponding gateway processing node according to the outgoing IP traffic steering rules.

3. The computer apparatus according to claim 1, wherein the gateway management maintains a virtual machine resource pool for running the gateway processing nodes, and the memory further comprises instructions that, when executed by the processing unit, cause the processing unit to perform operations to adjust allocation of virtual machine resources of the virtual machine resource pool, wherein each gateway processing node is run by one virtual machine in the virtual machine resource pool.

4. The computer apparatus according to claim 3, wherein the virtual machine resource pool comprises virtual machines in the following states: active virtual machines, which are booted and used for currently running gateway processing nodes; inactive virtual machines, which are booted and ready for running gateway processing nodes,
wherein the instructions to adjust allocation of virtual machine resources of the virtual machine resource pool further comprises instructions to:
upon a new IPSec tunnel being established or identification of the IPSec tunnel to be migrated, and a gateway management node fails to find a virtual machine having loads redundancy, select by the gateway management node, a virtual machine from the inactive virtual machines to run a new gateway processing node to process traffic of the new IPSec tunnel or traffic of the migrated IPSec tunnel.

5. The computer apparatus according to claim 2, wherein the gateway management node controls migration of the IPSec tunnel from a source gateway processing node to a target gateway processing node, wherein the memory further comprising instructions that, when executed by the processing unit, cause the processing unit to perform operations to:
generate, by the gateway management node, a new steering rule of incoming ESP/AH traffic and/or a new steering rule of outgoing IP traffic, and send the new steeling rule of incoming ESP/ATI traffic to the gateway input node and/or send the new steering rule of outgoing IP traffic to the gateway output node,
wherein during migration of the IPSec tunnel, the source gateway processing node uses an old IPSec SA to process data packets of incoming ESP/AH traffic and/or data packets of outgoing IP traffic of the migrated IPSec tunnel.

6. The computer apparatus according to claim 1, wherein the gateway management node monitors incoming ESP/AH traffic and/or outgoing IP traffic of IPSec tunnels processed by gateway processing nodes, and the memory further comprising instructions that, when executed by the processing unit, cause the processing unit to perform operations to determine that a sum of incoming ESP/AH traffic and/or outgoing IP traffic of all IPSec tunnels processed by the gateway processing node is over a load capability threshold of a virtual machine running the gateway processing node, wherein the IPSec tunnel is identified to be migrated based on the determination that the gateway processing node is over the load capability threshold.

7. The computer apparatus according to claim 6, wherein the gateway management node calculates a difference between loads capability threshold of virtual machines and incoming ESP/AH traffic and/or outgoing IP traffic of IPSec tunnels processed by gateway processing nodes, and the memory further comprising instructions that, when executed by the processing unit, cause the processing unit to perform operations to sort a plurality of IPSec tunnels processed by gateway processing nodes based on the difference, and select IPSec tunnels which need to be migrated in a descending order based on the difference, till the sum of incoming ESP/AH traffic and/or outgoing IP traffic of all IPSec tunnels processed by the gateway processing nodes is less than the load capability threshold.

8. A method applied in an internet security protocol gateway, the IPSec gateway comprises a gateway management node and a plurality of gateway processing nodes, the method comprises:
- generating, by a gateway management node in a control plane of the IPSec gateway, IPsec security associations (SAs) of a plurality of IPSec tunnels, and send them to a gateway processing node in a data plane of the IPSec gateway for processing data packets of incoming encapsulating security payload (ESP)/authentication header (AH) traffic and/or data packets of outgoing internet protocol (IP) traffic of corresponding IPSec tunnels, and steering the incoming ESP/AH traffic and/or outgoing IP traffic between a plurality of gateway processing nodes;
- processing, by the plurality of gateway processing nodes, received data packets of incoming ESP/AH traffic by using the IPSec SA sent by the gateway management node and generating data packets of incoming IP traffic, and/or processing received data packets of outgoing IP traffic and generating data packets of outgoing ESP/AH traffic;
- identifying an IPSec tunnel to be migrated from a source gateway processing node of the plurality of gateway processing nodes to a target gateway processing node of the plurality of gateway processing nodes;
- causing the source gateway processing node to generate a new IPSec SA
- transmitting the new IPSec SA to the target gateway processing node; and
- migrating the IPSec tunnel from the source gateway processing node to the target gateway processing node, wherein an existing connection to the source gateway processing node uses an IPSec SA of the IPSec SAs for the IPSec tunnel for incoming or outgoing traffic with the source gateway processing node; and wherein subsequent incoming or outgoing traffic is processed for the IPSec tunnel using the new IPSec SA and the target gateway processing node.

9. The method according to claim 8, wherein the IPSec gateway further comprises a gateway input node and/or a gateway output node, the method further comprises
- the steering, by the gateway management node, the incoming ESP/AH traffic and/or outgoing IP traffic between a plurality of gateway processing nodes comprises: generating incoming ESP/AH traffic steering tides for steering the incoming ESP/AH traffic between the plurality of gateway processing nodes, and sending the incoming ESP/AH traffic steering rules to the gateway input node, and/or generating outgoing IP traffic steering rules for steering outgoing IP traffic between the plurality of gateway processing nodes, and sending the outgoing IP traffic rules to the gateway output node;
- receiving, by the gateway input node, data packets of incoming ESP/AH traffic and sending received data packets of incoming ESP/AH traffic to corresponding gateway processing node according to the incoming ESP/AH traffic steering rules; and
- receiving, by the gateway output node, data packets of outgoing IP traffic and sending received data packets of outgoing IP traffic to corresponding gateway processing node according to the outgoing IP traffic steering rules.

10. The method according to claim 8, further comprises: maintaining, by the gateway management node, a virtual machine resource pool for running the gateway processing node, and adjusting allocation of virtual machine resources of the virtual machine resource pool, wherein each gateway processing node is run by one virtual machine in the virtual machine resource pool.

11. The method according to claim 10, wherein the virtual machine resource pool comprises virtual machines in the following states: active virtual machines, which are booted and used for currently running gateway processing nodes; inactive virtual machines, which are booted and ready for running gateway processing nodes,
- the adjusting; allocation of virtual machine resources of the virtual machine resource pool comprises:
  - upon a new IPSec tunnel is being established or it is necessary to perform migrating of IPSec tunnel, if a gateway management node fails to find a virtual machine having loads redundancy, the gateway management node selects a virtual machine from the inactive virtual machines to run a new gateway processing node to process traffic of the new IPSec tunnel or traffic of the migrated IPSec tunnel.

12. The method according to claim 10, wherein the adjusting allocation of virtual machine resources of the virtual machine resource pool comprises:
- adjusting allocation of virtual machine resources of the virtual machine resource pool based on performance requirements promised to a cloud tenant by a cloud provider corresponding to established IPSec tunnels and loads capability of virtual machines, so that the allocated resources in the virtual machine resource pool satisfy a sum of performance requirements of the established IPSec tunnels.

13. The method according to claim 9, wherein the gateway management node controls migration of the IPSec tunnels from the source gateway processing node to the target gateway processing node, wherein control of migration of the IPSec tunnel comprises:
- generating a new steering rule of incoming ESP/AH traffic and/or a new steering rule of outgoing IP traffic, and sending the new steering rule of incoming ESP/All traffic to the gateway input node and/or sending the new steering rule of outgoing IP traffic to the gateway output node,
- wherein during migration of the IPSec tunnel, the source gateway processing node uses an old IPSec SA to process data packets of incoming ESP/AH traffic and/or data packets of outgoing IP traffic of the migrated IPSec tunnel.

14. At least one non-transitory machine-readable medium including instructions that, when executed by at least one processor, cause the at least one processor to perform operations to:
- generate, by a gateway management node in a control plane of an internet protocol security (IPSec) gateway, IPsec security associations (SAs) of a plurality of IPSec tunnels, and send them to gateway processing nodes in a data plane of the IPSec gateway for processing data packets of incoming encapsulating security payload (ESP)/authentication header (AH) traffic and/or data packets of outgoing internet protocol (IP) traffic of corresponding IPSec tunnels, and steer the incoming ESP/AH traffic and/or outgoing IP traffic between a plurality of gateway processing nodes;

process, via the plurality of gateway processing nodes, received data packets of incoming ESP/AH traffic by using the IPSec SAs sent by the gateway management node and generate data packets of incoming IP traffic, and/or process received data packets of outgoing IP traffic and generate data packets of outgoing ESP/AH traffic;

identify an IPSec tunnel to be migrated from a source gateway processing node of the plurality of gateway processing nodes to a target gateway processing node of the plurality of gateway processing nodes;

cause the source gateway processing node to generate a new IPSec SA transmit the new IPSec SA to the target gateway processing node; and migrate the IPSec tunnel from the source gateway processing node to the target gateway processing node, wherein an existing connection to the source gateway processing node uses an IPSec SA of the IPSec SAs for the IPSec tunnel for incoming or outgoing traffic with the source gateway processing node; and wherein subsequent incoming or outgoing traffic is processed for the IPSec tunnel using the new IPSec SA and the target gateway processing node.

15. The at least one non-transitory machine-readable medium according to claim 14, wherein the instructions to steer the incoming ESP/AH traffic and/or outgoing IP traffic between the plurality of gateway processing nodes further comprises instructions to:

generate incoming ESP/AH traffic steering rules for steering the incoming ESP/AH traffic between the plurality of gateway processing nodes, and send the incoming ESP/AH traffic steering rules to a gateway input node, and/or generate outgoing IP traffic steering rules for steering outgoing IP traffic between the plurality of gateway processing nodes, and send the outgoing IP traffic rules to a gateway output node;

wherein the gateway input node receives data packets of incoming ESP/AH traffic and sends received data packets of incoming ESP/AH traffic to a corresponding gateway processing node according to the incoming ESP/AH traffic steering rules; and wherein the gateway output node to receives data packets of outgoing IP traffic and sends received data packets of outgoing IP traffic to a corresponding gateway processing node according to the outgoing IP traffic steering rules.

16. The at least one non-transitory machine-readable medium according to claim 14, wherein the gateway management maintains a virtual machine resource pool for running the gateway processing nodes, and further comprising instructions that, when executed by the at least one processor, cause the at least one processor to perform operations to adjust allocation of virtual machine resources of the virtual machine resource pool, wherein each gateway processing node is run by one virtual machine in the virtual machine resource pool.

17. The at least one non-transitory machine-readable medium according to claim 16, wherein the virtual machine resource pool comprises virtual machines in the following states: active virtual machines, which are booted and used for currently running gateway processing nodes; inactive virtual machines, which are booted and ready for running gateway processing nodes, wherein the instructions to adjust allocation of virtual machine resources of the virtual machine resource pool further comprises instructions to:

upon a new IPSec tunnel being established or identification of the IPSec tunnel to be migrated, and a gateway management node fails to find a virtual machine having loads redundancy, select by the gateway management node, a virtual machine from the inactive virtual machines to run a new gateway processing node to process traffic of the new IPSec tunnel or traffic of the migrated IPSec tunnel.

18. The at least one non-transitory machine-readable medium according to claim 15, wherein the gateway management node controls migration of the IPSec tunnel from a source gateway processing node to a target gateway processing node, further comprising instructions that, when executed by the at least one processor, cause the at least one processor to perform operations to:

generate, by the gateway management node, a new steering rule of incoming ESP/AH traffic and/or a new steering rule of outgoing IP traffic, and send the new steering rule of incoming ESP/AH traffic to the gateway input node and/or send the new steering rule of outgoing IP traffic to the gateway output node, wherein during migration of the IPSec tunnel, the source gateway processing node uses an old IPSec SA to process data packets of incoming ESP/AH traffic and/or data packets of outgoing IP traffic of the migrated IPSec tunnel.

19. The at least one non-transitory machine-readable medium according to claim 14, wherein the gateway management node monitors incoming ESP/AH traffic and/or outgoing IP traffic of IPSec tunnels processed by gateway processing nodes, and further comprising instructions that, when executed by the at least one processor, cause the at least one processor to perform operations to determine that a sum of incoming ESP/AH traffic and/or outgoing IP traffic of all IPSec tunnels processed by the gateway processing node is over a load capability threshold of a virtual machine running the gateway processing node, wherein the IPSec tunnel is identified to be migrated based on the determination that the gateway processing node is over the load capability threshold.

20. The at least one non-transitory machine-readable medium according to claim 19, wherein the gateway management node calculates a difference between loads capability threshold of virtual machines and incoming ESP/AH traffic and/or outgoing IP traffic of IPSec tunnels processed by gateway processing nodes, and further comprising instructions that, when executed by the at least one processor, cause the at least one processor to perform operations to sort a plurality of IPSec tunnels processed by gateway processing nodes based on the difference, and select IPSec tunnels which need to be migrated in a descending order based on the difference, till the sum of incoming ESP/AH traffic and/or outgoing IP traffic of all IPSec tunnels processed by the gateway processing nodes is less than the load capability threshold.

* * * * *